US011772512B2

(12) United States Patent
Hashimoto et al.

(10) Patent No.: US 11,772,512 B2
(45) Date of Patent: Oct. 3, 2023

(54) VEHICLE POWER SUPPLY SYSTEM AND VEHICLE DISPATCH SYSTEM

(71) Applicant: Panasonic Intellectual Property Management Co., Ltd., Osaka (JP)

(72) Inventors: Makoto Hashimoto, Kyoto (JP); Yohei Ishii, Osaka (JP); Tohru Watanabe, Gifu (JP); Tadao Kimura, Hyogo (JP); Masaaki Takegata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 441 days.

(21) Appl. No.: 17/266,787

(22) PCT Filed: Feb. 13, 2019

(86) PCT No.: PCT/JP2019/005066
§ 371 (c)(1),
(2) Date: Feb. 8, 2021

(87) PCT Pub. No.: WO2020/044597
PCT Pub. Date: Mar. 5, 2020

(65) Prior Publication Data
US 2021/0339650 A1    Nov. 4, 2021

(30) Foreign Application Priority Data

Aug. 27, 2018   (JP) .................................. 2018-158154

(51) Int. Cl.
*B60L 58/16*    (2019.01)
*G06Q 10/0631*  (2023.01)
(Continued)

(52) U.S. Cl.
CPC .............. *B60L 58/16* (2019.02); *B60L 15/20* (2013.01); *B60L 50/60* (2019.02); *B60L 58/12* (2019.02);
(Continued)

(58) Field of Classification Search
CPC .......... B60L 58/16; B60L 50/60; B60L 58/12; B60L 15/20; B60L 2240/12;
(Continued)

(56) References Cited

U.S. PATENT DOCUMENTS

2016/0236581 A1   8/2016   Tashiro et al.
2016/0297318 A1   10/2016  Kirimoto

FOREIGN PATENT DOCUMENTS

JP   2010-016956 A    1/2010
JP   2011-239646      11/2011
(Continued)

OTHER PUBLICATIONS

International Search Report of PCT application No. PCT/JP2019/005066 dated May 7, 2019.

*Primary Examiner* — Robert L Deberadinis
(74) *Attorney, Agent, or Firm* — McDermott Will & Emery LLP

(57) ABSTRACT

In a vehicle power supply system mounted on an electric vehicle, a vehicle controller switches a discharge power limit to a motor during travel of the electric vehicle according to degradation information of a battery module to which a plurality of cells are connected, the degradation information being calculated in advance before the travel of the electric vehicle. For example, the vehicle controller switches a limit of a maximum acceleration and/or maximum speed of the electric vehicle as the switching of the discharge power limit.

15 Claims, 12 Drawing Sheets

(51) Int. Cl.
*G06Q 30/0283* (2023.01)
*H02J 7/00* (2006.01)
*B60L 50/60* (2019.01)
*B60L 58/12* (2019.01)
*B60L 15/20* (2006.01)
*G05B 19/042* (2006.01)
*G06Q 10/087* (2023.01)
*G06Q 50/30* (2012.01)
*H01M 10/48* (2006.01)
*G06Q 10/20* (2023.01)
*G06Q 50/06* (2012.01)

(52) U.S. Cl.
CPC ..... *G05B 19/042* (2013.01); *G06Q 10/06315* (2013.01); *G06Q 10/087* (2013.01); *G06Q 30/0284* (2013.01); *G06Q 50/30* (2013.01); *H01M 10/48* (2013.01); *H01M 10/486* (2013.01); *H02J 7/0013* (2013.01); *H02J 7/0047* (2013.01); *B60L 2240/12* (2013.01); *B60L 2240/14* (2013.01); *B60L 2240/545* (2013.01); *B60L 2240/547* (2013.01); *B60L 2240/549* (2013.01); *B60L 2240/60* (2013.01); *B60L 2240/66* (2013.01); *B60L 2240/68* (2013.01); *B60L 2240/70* (2013.01); *G05B 2219/2639* (2013.01); *G06Q 10/20* (2013.01); *G06Q 50/06* (2013.01); *H01M 2220/20* (2013.01)

(58) Field of Classification Search
CPC ........... B60L 2240/14; B60L 2240/545; B60L 2240/547; B60L 2240/549; B60L 2240/60; B60L 2240/66; B60L 2240/68; B60L 2240/70; G05B 19/042; G05B 2219/2639; G06Q 10/06315; G06Q 10/087; G06Q 30/0284; G06Q 50/30; G06Q 10/20; H01M 10/48; H01M 10/486; H01M 10/0631; H01M 30/0283; H02J 7/0047; H02J 7/0013; H02J 7/00
See application file for complete search history.

(56) References Cited

FOREIGN PATENT DOCUMENTS

| | | |
|---|---|---|
| JP | 2012-001137 | 1/2012 |
| JP | 2013-169036 A | 8/2013 |
| JP | 2013-232129 | 11/2013 |
| JP | 2015-076958 | 4/2015 |
| WO | 2014/027389 A1 | 2/2014 |
| WO | 2015/052567 | 4/2015 |
| WO | 2015/098012 A1 | 7/2015 |

| Average storage temperature from time of previous return | |
|---|---|
| 0°C or less | 1.0 |
| 1~15°C | 0.5 |
| 16~30°C | 0.3 |
| 31~40°C | 0.5 |
| 41°C or more | 1.0 |

(b)

| Number of sudden accelerations per unit time | |
|---|---|
| 21 times or more | 1.0 |
| 16~20 times | 0.8 |
| 11~15 times | 0.6 |
| 6~10 times | 0.4 |
| 0~5 times | 0.2 |

(c)

| Degradation degree index | Degradation degree |
|---|---|
| 1.0≥degradation degree index>0.7 | Large |
| 0.7≥degradation degree index>0.4 | Medium |
| 0.4≥degradation degree index>0.0 | Small |

(d)

| Degradation degree | Output limit | Discharge power limit | | |
|---|---|---|---|---|
| | | Upper limit power | Acceleration limit | Maximum speed |
| Large | Set power limit to 70% | XX[kW] | Large | 60km/h |
| Medium | Set power limit to 80% | YY[kW] | Medium | 80km/h |
| Small | No limit | None | Small | 120km/h |

(e)

| SOH | Degradation degree |
|---|---|
| 80%<SOH≦85% | Large |
| 85%<SOH≦95% | Medium |
| 95%<SOH≦100% | Small |

FIG. 8

| Reservable vehicle | Acceleration limit | Speed limit | Fee |
|---|---|---|---|
| Vehicle A | Small | 120km/h | 15000 yen |
| Vehicle B | Medium | 80km/h | 8000 yen |
| Vehicle C | Large | 60km/h | 4000 yen |

Reservable vehicle list (from (date) to (date))

24a

Reserve

| Reservable plan | Travelable distance | Fee | |
|---|---|---|---|
| Vehicle A, plan 1 | 50km/h | 2000 yen | ⦿ |
| Vehicle A, plan 2 | 100km/h | 3000 yen | ○ |
| Vehicle A, plan 3 | 200km/h | 6000 yen | ○ |
| Vehicle B, plan 1 | 100km/h | 3500 yen | ○ |
| Vehicle B, plan 2 | 200km/h | 7000 yen | ○ |
| Vehicle B, plan 3 | 300km/h | 14000 yen | ○ |

Reservable plan list (from (date) to (date))

Reserve

VEHICLE POWER SUPPLY SYSTEM AND VEHICLE DISPATCH SYSTEM

CROSS-REFERENCE TO RELATED APPLICATIONS

This application is a U.S. national stage application of the PCT International Application No. PCT/JP2019/005066 filed on Feb. 13, 2019, which claims the benefit of foreign priority of Japanese patent application No. 2018-158154, filed on Aug. 27, 2018, the contents all of which are incorporated herein by reference.

TECHNICAL FIELD

The present invention relates to a vehicle power supply system mounted on an electric vehicle and to a vehicle dispatch system for a plurality of electric vehicles.

BACKGROUND ART

In recent years, electric vehicles (EVs) have been widespread. With this, car rental, car sharing, taxi dispatch and product delivery service, which use EVs, have also been increasing. On such an EV, a secondary battery such as a lithium ion battery and a nickel-metal hydride battery is mounted as a key device.

Degradation of the secondary battery can be approximated by the sum of storage degradation and cycle degradation. Between these, the storage degradation depends on State of Charge (SOC) and a temperature. The cycle degradation depends on an SOC range, a temperature, and a current rate, at which the secondary battery is used.

While the EV is traveling, as speed thereof increases, the current rate and temperature of the secondary battery rise, and the cycle degradation accelerates. Also, when sudden acceleration or sudden deceleration is made, the current rate and temperature of the secondary battery change significantly, and the cycle degradation accelerates.

With regard to prevention of the degradation of an in-vehicle secondary battery, for example, there has been proposed a method of preventing overcharge and overdischarge without impairing drivability by setting a limit on charge or discharge power based on changes in load state and battery voltage (for example, see PTL 1).

CITATION LIST

Patent Literature

PTL 1: Unexamined Japanese Patent Publication No. 2011-239646

SUMMARY OF THE INVENTION

The above-mentioned method does not consider a current degradation state (for example, State of Health (SOH)) of the in-vehicle secondary battery. For example, when the current degradation state is in the end period of in-vehicle use, there is also a possibility that the in-vehicle secondary battery may reach the end point of the in-vehicle use while the vehicle is traveling.

The present invention has been made in view of such a circumstance, and an object of the present invention is to provide a technique for extending a lifetime of a secondary battery, which is mounted on an electric vehicle, by suppressing degradation of the secondary battery while the electric vehicle is traveling.

In order to solve the above problem, a vehicle power supply system according to a certain aspect of the present invention is a vehicle power supply system mounted on an electric vehicle, including: a battery module to which a plurality of cells are connected; and a vehicle controller that switches a discharge power limit to a motor during travel of the electric vehicle according to the degradation information of the battery module, the degradation information being calculated in advance before the travel of the electric vehicle.

Note that any desired combinations of the above-described constituent elements and modifications of the features of the present invention in methods, devices, systems, computer programs, or other entities are still effective as other aspects of the present invention.

Advantageous Effect of Invention

According to the present invention, the degradation of the secondary battery mounted on the electric vehicle while the electric vehicle is traveling is suppressed, whereby the lifetime of the secondary battery can be extended.

BRIEF DESCRIPTION OF DRAWINGS

FIGS. 7(a) to 7(e) are diagrams for explaining degradation information of a secondary battery and a specific example of a discharge power limit.

FIG. 8 is a diagram illustrating an example of a display screen on which a reservation candidate list according to the first exemplary embodiment is displayed.

FIG. 12 is a diagram illustrating an example of a display screen on which a reservation candidate list according to the second exemplary embodiment is displayed.

DESCRIPTION OF EMBODIMENTS

Figure 1:
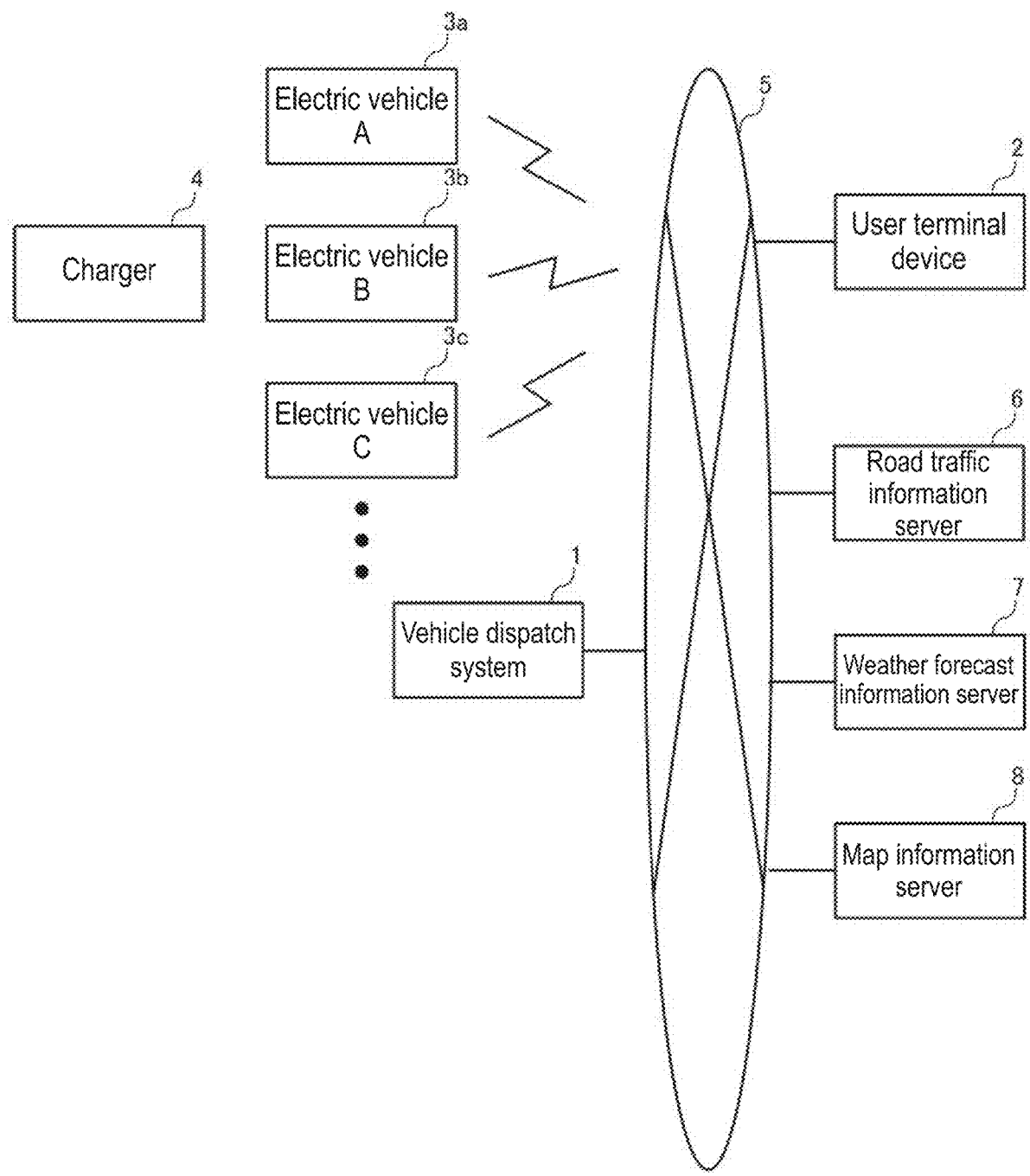
FIG. 1 is a diagram for explaining a vehicle dispatch system according to a first exemplary embodiment of the present invention.

FIG. 1 is a diagram for explaining vehicle dispatch system 1 according to a first exemplary embodiment of the present invention. Vehicle dispatch system 1 according to the first exemplary embodiment is a system managed by a car rental company. The car rental company owns a plurality of electric vehicles 3 (electric vehicle A 3a, electric vehicle B 3b, electric vehicle C 3c, . . . ) rentable to users. The plurality of electric vehicles 3 owned by the car rental company may be of the same vehicle type or may be of different vehicle types. In the present exemplary embodiment, pure EVs which do not mount engines thereon are assumed as electric vehicles 3. Charger 4 is a charger for charging electric vehicles 3, and is installed in a business office or garage of the car rental company.

The plurality of electric vehicles 3 are parked in a parking lot or garage of the business office of the car rental company in a state of being on standby without being used by users. The plurality of electric vehicles 3 each have a wireless communication function and are connectable to network 5 to which vehicle dispatch system 1 is connected. Network 5 is a general term for communication paths such as the Internet and leased lines, in which a communication medium and protocol do not matter.

User terminal device 2 operated by each user who wishes to receive dispatch of electric vehicle 3 is connectable to network 5. Moreover, a variety of information servers such as road traffic information server 6, weather forecast information server 7, and map information server 8 are connected to network 5.

Figure 2:
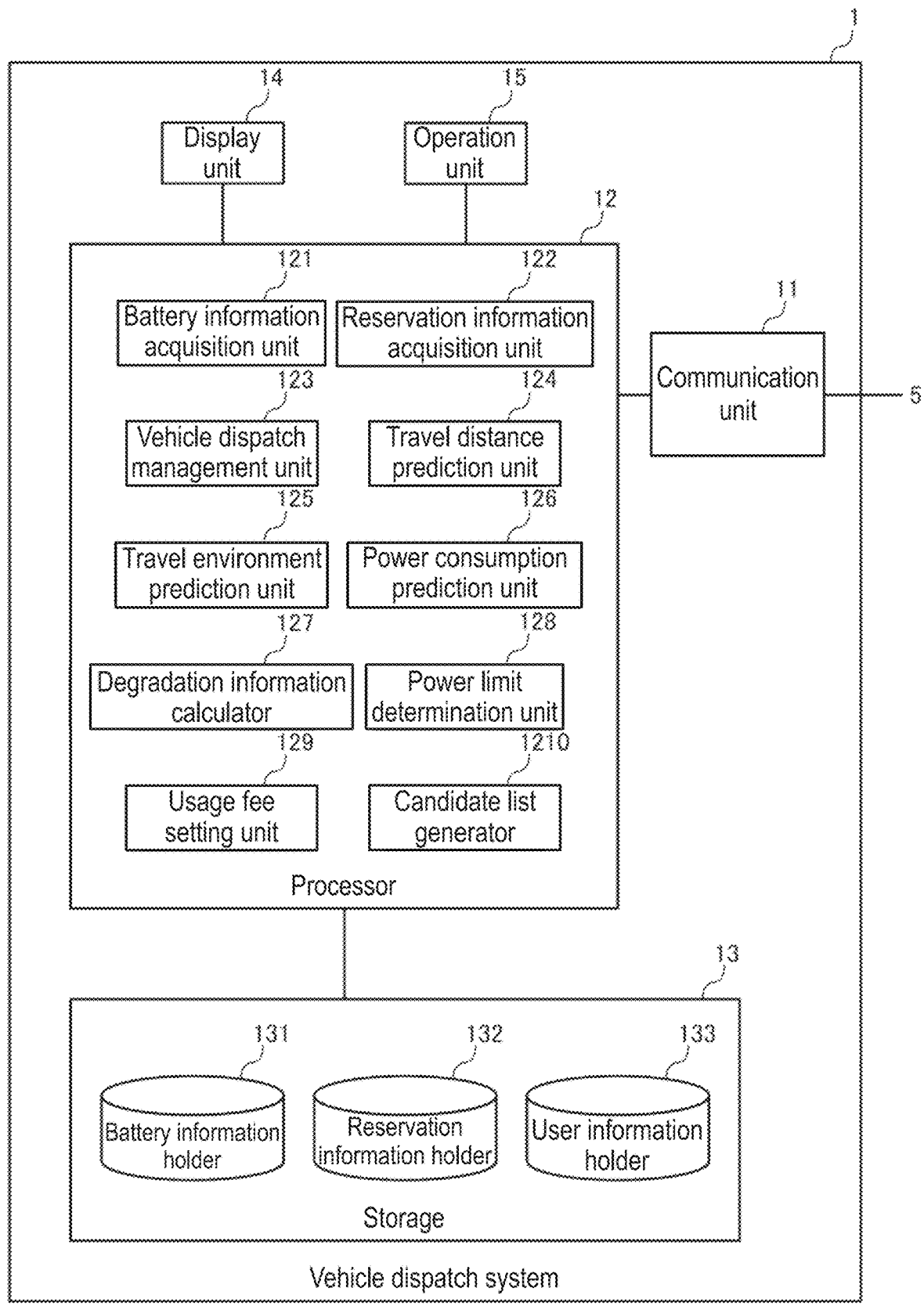
FIG. 2 is a diagram illustrating a configuration example of the vehicle dispatch system according to the first exemplary embodiment.

FIG. 2 is a diagram illustrating a configuration example of vehicle dispatch system 1 according to the first exemplary embodiment. Vehicle dispatch system 1 is composed of, for example, one or a plurality of information processing devices (for example, servers and personal computers (PCs)). A part or all of the information processing devices which constitute vehicle dispatch system 1 may be present in a data center on a cloud.

Vehicle dispatch system 1 includes communication unit 11, processor 12, storage 13, display unit 14, and operation unit 15. Communication unit 11 is a communication interface for connecting to network 5 by wire or wirelessly.

Processor 12 includes battery information acquisition unit 121, reservation information acquisition unit 122, vehicle dispatch management unit 123, travel distance prediction unit 124, travel environment prediction unit 125, power consumption prediction unit 126, degradation information calculator 127, power limit determination unit 128, usage fee setting unit 129, and candidate list generator 1210. Functions of processor 12 can be achieved by cooperation of hardware resources and software resources, or by the hardware resources alone. A central processing unit (CPU), a graphical processing unit (GPU), a read only memory (ROM), a random access memory (RAM), an application-specific integrated circuit (ASIC), a field programmable gate array (FPGA), and other large-scale integrations (LSIs) can be used as the hardware resources. Programs such as an operating system and applications can be used as the software resources.

Storage 13 includes battery information holder 131, reservation information holder 132, and user information holder 133. Storage unit 13 includes a non-volatile recording medium such as a hard disk drive (HDD) and solid-state drive (SSD), and stores varieties of programs and data. Moreover, storage 13 may have a configuration to which a recording medium such as an optical disk is attachable as an auxiliary storage. Display unit 14 includes a display such as a liquid crystal display and an organic electroluminescence (EL) display, and displays an image generated by processor 12. Operation unit 15 is a user interface such as a keyboard, a mouse, and a touch panel, and accepts user's operations in vehicle dispatch system 1.

Figure 3:
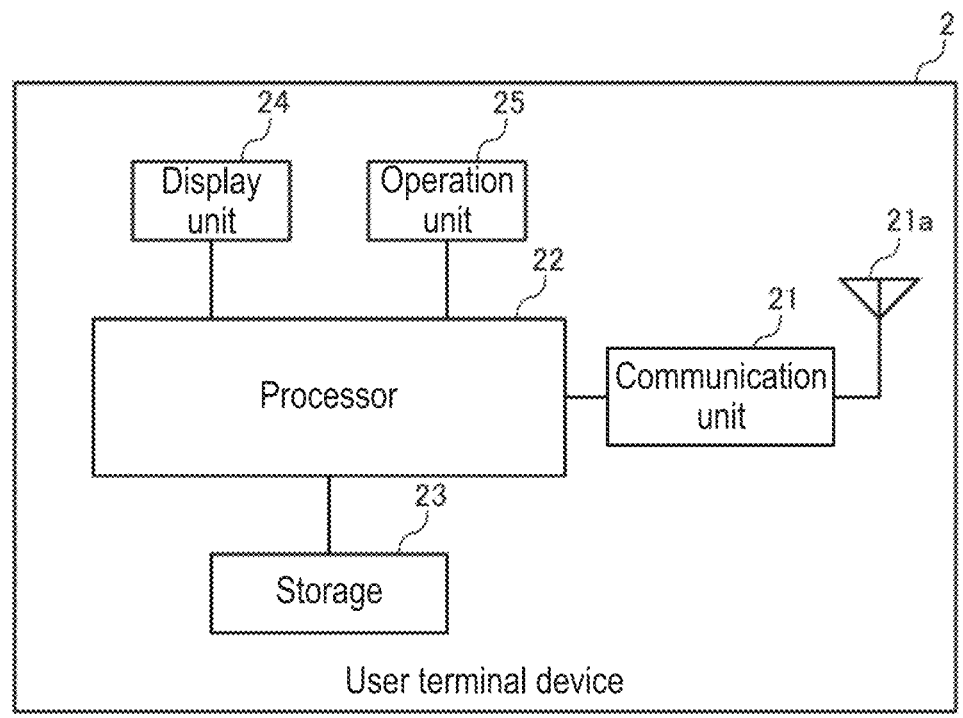
FIG. 3 is a diagram illustrating a configuration example of a user terminal device.

FIG. 3 is a diagram illustrating a configuration example of user terminal device 2. For example, a smartphone, a feature phone, a tablet, a PC, or the like can be used as user terminal device 2. An example of using a smartphone as user terminal device 2 will be assumed below.

User terminal device 2 includes communication unit 21, antenna 21a, processor 22, storage 23, display unit 24, and operation unit 25. Communication unit 21 performs signal processing for wirelessly connecting to network 5 via antenna 21a. For example, communication unit 21 performs signal processing for wirelessly communicating with a mobile phone base station and signal processing for wirelessly communicating with a wireless local area network (LAN) access point. Note that, when a PC is used as user terminal device 2, the PC is connectable to network 5 by wire. In that case, antenna 21a is unnecessary.

Functions of processor 22 can be achieved by cooperation of hardware resources and software resources, or by the hardware resources alone. A CPU, a GPU, a ROM, a RAM, an ASIC, an FPGA, and other LSIs can be used as the hardware resources. Programs such as an operating system and applications can be used as the software resources. Storage unit 23 includes a non-volatile recording medium such as a flash memory, and stores varieties of programs and data. Moreover, storage 23 may have a configuration to which a recording medium such as a semiconductor memory card is attachable as an auxiliary storage.

Display unit 24 includes a display such as a liquid crystal display and an organic EL display, and displays an image generated by processor 22. Operation unit 25 is a user interface such as a touch panel and a microphone, and accepts user's operations in user terminal device 2.

Figure 4:
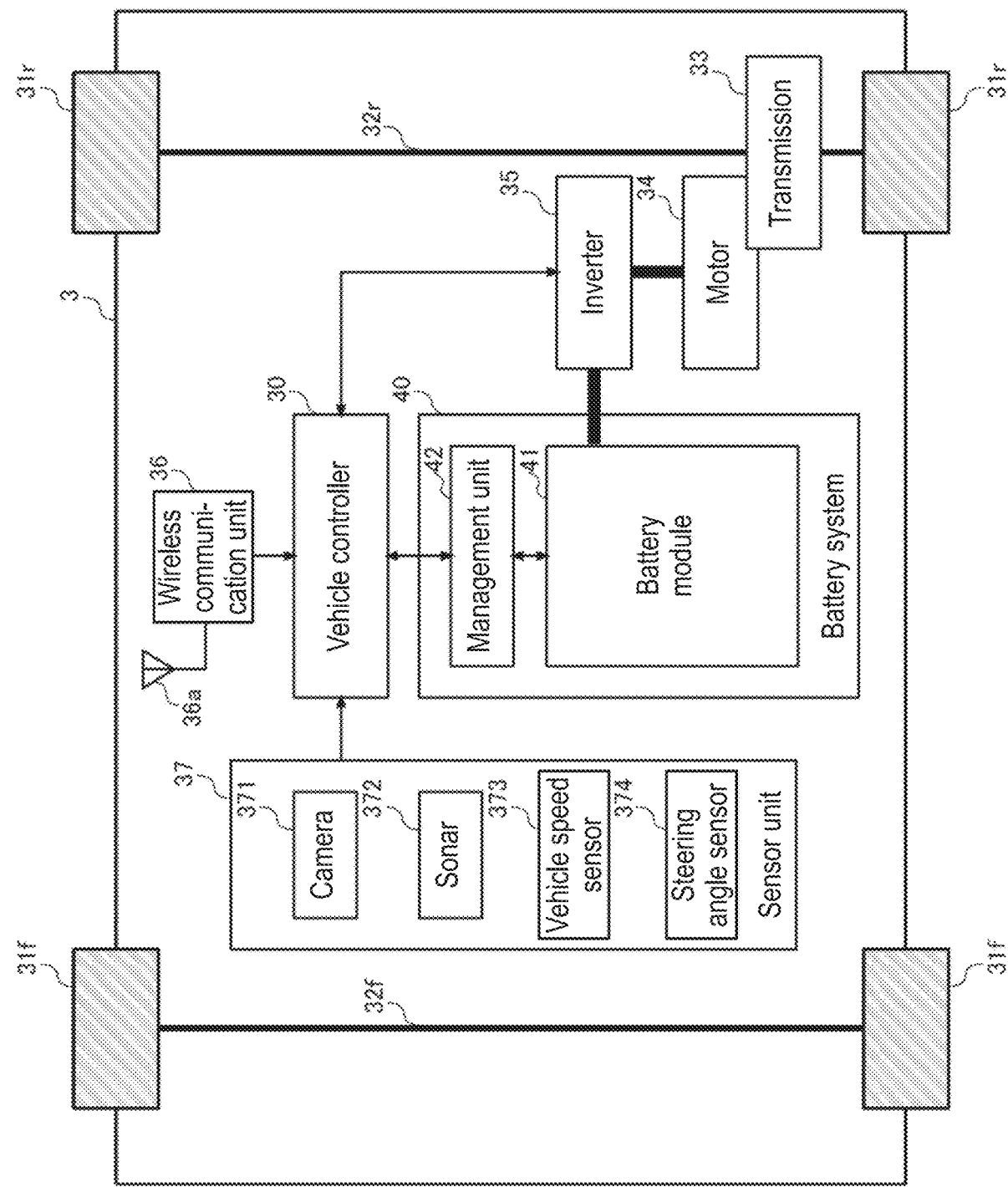
FIG. 4 is a diagram illustrating a schematic configuration of an electric vehicle.

FIG. 4 is a diagram illustrating a schematic configuration of electric vehicle 3. Electric vehicle 3 illustrated in FIG. 4 is a rear-wheel drive (2WD) EV including a pair of front wheels 31f, a pair of rear wheels 31r, and motor 34 as a power source. The pair of front wheels 31f are coupled to each other by front wheel axle 32f, and the pair of rear wheels 31r are coupled to each other by rear wheel axle 32r. Transmission 33 transmits rotation of motor 34 to rear wheel axle 32r at a predetermined conversion ratio.

Vehicle controller 30 is a vehicle electronic control unit (ECU) that controls the whole of electric vehicle 3, and for example, may be composed of an integrated vehicle control module (VCM). From sensor unit 37 in electric vehicle 3, vehicle controller 30 acquires a variety of sensor information for detecting a behavior of electric vehicle 3 and/or a surrounding environment of electric vehicle 3.

Sensor unit 37 is a general term for sensors installed in electric vehicle 3. In FIG. 4, camera 371, sonar 372, vehicle speed sensor 373, and steering angle sensor 374 are listed as typical sensors.

Camera 371 is installed at a position of being capable of taking an image of at least a front of electric vehicle 3. Camera 371 includes a solid-state imaging element (for example, a complementary metal oxide semiconductor (CMOS) image sensor, a charge-coupled device (CCD) image sensor) and a signal processing circuit. The solid-state imaging element converts incident light into an electric signal, and the signal processing circuit performs signal processing such as A/D conversion and noise removal on image data subjected to photoelectric conversion by the solid-state imaging element, and outputs the image data to vehicle controller 30.

Such cameras 371 may be installed at four spots, which are front, rear, right, and left of electric vehicle 3. In this case, a front image, a rear image, a left-side image, and a right-side image, which are taken by these four cameras 371, are synthesized with one another, thus making it possible to generate a bird's-eye view image. Note that cameras 371 installed at the respective positions may be stereo cameras instead of monocular cameras. In this case, a distance to an object can also be estimated. Moreover, infrared cameras may be installed in addition to visible light cameras. In this case, even at night, the surrounding environment of electric vehicle 3 can be grasped based on images taken by cameras 371.

A plurality of sonars 372 are installed around electric vehicle 3 so as to cover the periphery of electric vehicle 3. Since a detection range of each of sonars 372 is narrower than an imaging range of each of camera 371, it is preferable to install a larger number of sonars 372 than a number of cameras 371. Sonars 372 can measure distances to an object, which is difficult to detect with monocular cameras. Note that, in order to grasp the surrounding environment of electric vehicle 3, Light Detection and Ranging (LIDAR) and a millimeter-wave radar may be mounted in addition to cameras 371 and sonars 372.

Vehicle speed sensor 373 generates a pulse signal proportional to the rotation speed of front wheel axle 32f or rear wheel axle 32r, and transmits the generated pulse signal to vehicle controller 30. Vehicle controller 30 detects the speed of electric vehicle 3 based on the pulse signal received from vehicle speed sensor 373. Steering angle sensor 374 detects the steering angle of a steering wheel and transmits the detected steering angle to vehicle controller 30.

In addition, a variety of sensors are installed in electric vehicle 3. For example, an accelerator pedal opening sensor, a brake pedal opening sensor, a global positioning system (GPS) sensor, a gyro sensor, and the like are installed.

Wireless communication unit 36 performs signal processing for wirelessly connecting to network 5 via antenna 36a. As a wireless communication network to which electric vehicle 3 is wirelessly connectable, for example, there can be used a mobile phone network (cellular network), a wireless LAN, Electronic Toll Collection System (ETC), Dedicated Short Range Communications (DSRC), Vehicle-to-Infrastructure (V2I), and Vehicle-to-Vehicle (V2V).

Figure 5:
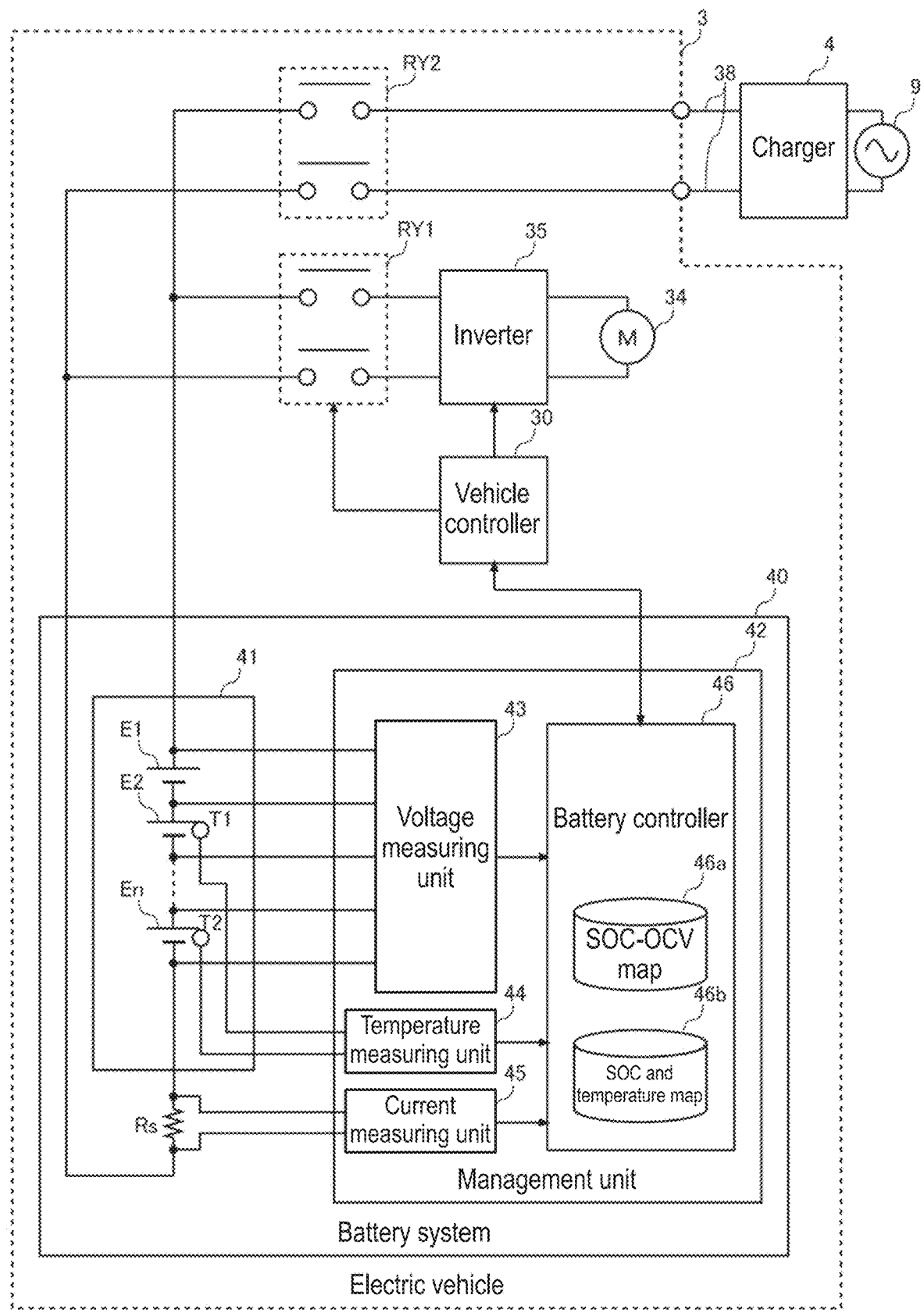
FIG. 5 is a diagram for explaining a detailed configuration of a battery system mounted on the electric vehicle illustrated in FIG. 4.

FIG. 5 is a diagram for explaining a detailed configuration of battery system 40 mounted on electric vehicle 3 illustrated in FIG. 4. Battery system 40 is connected to motor 34 via first relay RY1 and inverter 35. During power running, inverter 35 converts DC power, which is supplied from battery system 40, into AC power, and supplies the AC power to motor 34. During regeneration, inverter 35 converts AC power, which is supplied from motor 34, into DC power, and supplies the DC power to battery system 40. Motor 34 is a three-phase AC motor, and during power running, rotates according to the AC power supplied from inverter 35. During regeneration, motor 34 converts rotational energy due to deceleration into AC power, and supplies the AC power to inverter 35.

First relay RY1 is a contactor inserted between wires which connect battery system 40 and inverter 35 to each other. During traveling, vehicle controller 30 controls first relay RY1 to an on state (closed state), and electrically connects battery system 40 and the power system of electric vehicle 3 to each other. During stop, in principle, vehicle controller 30 controls first relay RY1 to an off state (open state), and electrically shuts off battery system 40 and the power system of electric vehicle 3 from each other. Note that another type of switch such as a semiconductor switch may be used in place of the relay.

Battery system 40 can be charged from commercial power system 9 by connecting with charging cable 38 to charger 4 installed outside electric vehicle 3. Charger 4 is connected to commercial power system 9, and charges battery system 40, which is in electric vehicle 3, via charging cable 38. In electric vehicle 3, second relay RY2 is inserted between wires which connect battery system. 40 and charger 4 to each other. Note that another type of switch such as a semiconductor switch may be used in place of the relay. Management unit 42 of battery system 40 controls second relay RY2 to an on state (closed state) before the charging is started, and controls second relay RY2 to an off state (open state) after the charging is completed.

Generally, battery system 40 is charged with AC in the case of normal charging, and is charged with DC in the case of rapid charging. When battery system 40 is charged with AC, AC power is converted into DC power by an AC/DC converter (not shown) inserted between second relay RY2 and battery system 40.

Battery system 40 includes battery module 41 and management unit 42, and battery module 41 includes a plurality of cells E1-En connected in series to one another. Note that battery module 41 may be configured by connecting a plurality of battery modules in series to one another or in series and parallel to one another. As the cells, there can be used lithium ion battery cells, nickel-metal hydride battery cells, lead battery cells, and the like. In the present description, an example of using the lithium ion battery cells (nominal voltage: 3.6-3.7V) will be assumed below. A number of cells E1-En connected in series is determined according to the driving voltage of motor 34.

Shunt resistor Rs is connected in series to the plurality of cells E1 to En. Shunt resistor Rs functions as a current detection element. Note that a Hall element may be used in place of shunt resistor Rs. Moreover, in battery module 41, a plurality of temperature sensors T1, T2 for detecting the temperatures of the plurality of cells E1 to En are installed. One temperature sensor may be installed in the battery module, or one temperature sensor may be installed for each of the plurality of cells. For example, thermistors can be used for temperature sensors T1, T2.

Management unit 42 includes voltage measuring unit 43, temperature measuring unit 44, current measuring unit 45, and battery controller 46. Each node of the plurality of cells E1 to En connected in series and voltage measuring unit 43 are connected to each other by a plurality of voltage lines. Voltage measuring unit 43 measures each voltage between two adjacent voltage lines, thereby measuring the voltage of each of cells E1 to En. Voltage measuring unit 43 transmits the measured voltage of each of cells E1 to En to battery controller 46.

Since voltage measuring unit 43 has a high voltage with respect to battery controller 46, voltage measuring unit 43 and battery controller 46 are connected to each other in an insulated state by a communication line. Voltage measuring unit 43 can be composed of an ASIC or a general-purpose analog front-end IC. Voltage measuring unit 43 includes a multiplexer and an A/D converter. The multiplexer outputs each voltage between two adjacent voltage lines to the A/D converter in order from the top. The A/D converter converts each analog voltage, which is input from the multiplexer, into a digital value.

Temperature measuring unit 44 includes voltage dividing resistors and an A/D converter. The A/D converter sequentially converts a plurality of analog voltages divided by the plurality of temperature sensors T1, T2 and a plurality of the voltage dividing resistors into digital values, and outputs the digital values to battery controller 46. Battery controller 46 estimates the temperatures of the plurality of cells E1 to En based on the digital values. For example, battery controller 46 estimates the temperature of each of cells E1 to En based on a value measured by the temperature sensor closest to each of cell E1-En.

Current measuring unit 45 includes a differential amplifier and an A/D converter. The differential amplifier amplifies a voltage between both ends of shunt resistor Rs, and outputs the amplified voltage to the A/D converter. The A/D converter converts the voltage, which is input from the differential amplifier, into a digital value, and outputs the digital value to battery controller 46. Battery controller 46 estimates a current flowing through the plurality of cells E1-En based on the digital value.

Note that, when the A/D converter is mounted in battery controller 46, and an analog input port is installed in battery controller 46, temperature measuring unit 44 and current measuring unit 45 may output an analog voltage to battery controller 46, and the analog voltage may be converted into a digital value by the A/D converter in battery controller 46.

Battery controller 46 manages states of the plurality of cells E1 to En based on the voltages, temperatures and currents of the plurality of cells E1 to En, which are measured by voltage measuring unit 43, temperature measuring unit 44, and current measuring unit 45. Battery controller 46 and vehicle controller 30 are connected to each other by an in-vehicle network. For example, a controller area network (CAN) or a local interconnect network (LIN) can be used as the in-vehicle network.

Battery controller 46 can be composed a microcomputer and a non-volatile memory (for example, an electrically erasable programmable read-only memory (EEPROM) and a flash memory). SOC and Open Circuit Voltage (OCV) map 46a and SOC and temperature map 46b are held in the non-volatile memory. SOC-OCV map 46a describes characteristic data of SOC-OCV curves of the plurality of cells E1 to En.

Battery controller 46 estimates the SOC and SOH of each of the plurality of cells E1 to En. Battery controller 46 estimates the SOC by combining the OCV method and the current integration method. The OCV method is a method of estimating the SOC based on the OCV of each of cells E1 to En measured by voltage measuring unit 43 and the characteristic data of the SOC-OCV curve described in SOC-OCV map 46a. The current integration method is a method of estimating the SOC based on the OCV at the start of charging or discharging each of cells E1 to En and an integrated value of the currents measured by current measuring unit 45. In the current integration method, a measurement error of current measuring unit 45 accumulates as a charging or discharging time becomes longer. Hence, it is preferable to correct the SOC, which is estimated by the current integration method, using the SOC estimated by the OCV method.

The SOH is defined as a ratio of a current full charge capacity to an initial full charge capacity, and the lower a numeric value (the closer to 0%), the more the degradation progresses. The SOH may be obtained by measuring a capacity by complete charge or discharge, or may be obtained by adding storage degradation and cycle degradation to each other. The storage degradation can be estimated based on the SOC, temperature, and storage degradation rate. The cycle degradation can be estimated based on an SOC range, temperature, current rate, and cycle degradation rate, which are for use. The storage degradation rate and the cycle degradation rate can be derived in advance by experiments or simulations. The SOC, the temperature, the SOC range, and the current rate can be determined by measurements.

Moreover, the SOH can also be estimated based on a correlation with internal resistance of each of the cells. The internal resistance can be estimated by dividing a voltage drop, which is generated when a predetermined current is passed through the cell for a predetermined time, by a value of the current. The internal resistance has a relationship of decreasing as the temperature rises, and has a relationship of increasing as the SOH decreases.

SOC and temperature map 46b is a map that defines a relationship between the SOC and temperature of the cell and a power limit value thereof. The power limit value is a value that defines an upper limit value of a current or power, which is recommended for suppressing the degradation of the cell. A battery manufacturer determines the recommended power limit value for each of a variety of combinations of the SOC and temperature of the cell based on numerical simulations and experiments in advance, and maps a relationship between these. The recommended power limit value is set to, for example, a current value or a power value, which is for preventing the degradation from progressing faster than the average life curve of the cell. The recommended power limit value is set separately for each of charging and discharging. The SOC and temperature map 46b generated by the battery manufacturer is registered in the non-volatile memory in battery controller 46.

Note that the relationship between the SOC and temperature of the cell and the recommended power limit value may be defined as a function. In that case as well, the derived function is registered in the non-volatile memory in battery controller 46.

Note that the SOC and temperature map 46b may be a map that defines a relationship between the SOC, temperature, and SOH of the cell and the power limit value thereof. The battery manufacturer determines the recommended power limit value for each of a variety of combinations of the SOC, temperature, and SOH of the cell based on numerical simulations and experiments in advance, and maps a relationship between these. The internal resistance may be used in place of the SOH.

Battery controller 46 notifies vehicle controller 30 of the states of the plurality of cells E1 to En via the in-vehicle network. For example, battery controller 46 totals the respective SOCs of the plurality of cells E1 to En to calculate the SOC of the whole of battery module 41, and notifies vehicle controller 30 of the calculated SOC of the whole of battery module 41. Further, vehicle controller 30 notifies vehicle controller 30 of the above-mentioned power limit value.

Vehicle controller 30 sets the power limit value, which is received from battery controller 46 of battery system 40, into inverter 35. Inverter 35 controls an output current or output power (discharge current or discharge power from battery module 41) within a range of the set power limit value.

Figure 6:
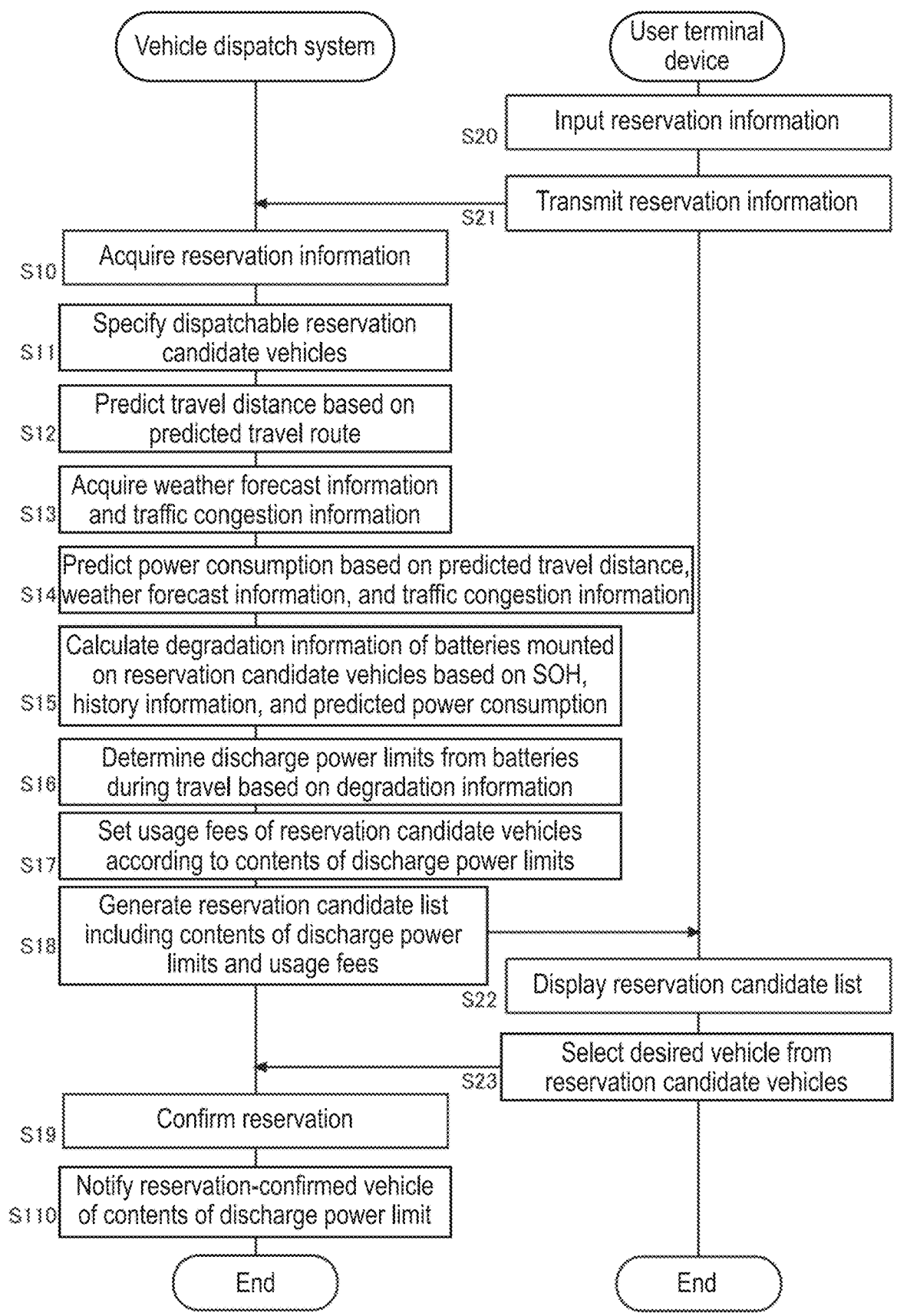
FIG. 6 is a flowchart for explaining an operation example of the vehicle dispatch system and the user terminal device according to the first exemplary embodiment.

FIG. 6 is a flowchart for explaining an operation example of vehicle dispatch system 1 and user terminal device 2 according to the first exemplary embodiment. When a user who wishes to rent electric vehicle 3 operates operation unit 25 of user terminal device 2 to input reservation information, processor 22 of user terminal device 2 accepts the input reservation information (S20). The user inputs at least information on a departure place, departure date and time, a destination, a return place, and return date and time as the reservation information. Processor 22 of user terminal device 2 transmits the input reservation information to vehicle dispatch system 1 via network 5 (S21).

Reservation information acquisition unit 122 of vehicle dispatch system 1 acquires the reservation information transmitted from user terminal device 2 (S10). Based on the acquired reservation information, vehicle dispatch management unit 123 determines reservation candidates for electric vehicle 3, which are dispatchable to the above user (hereinafter, the reservation candidates will be referred to as reservation candidate vehicles) (S11). From among the plurality of electric vehicles 3 owned by the car rental company, as the reservation candidate vehicles, vehicle dispatch management unit 123 basically selects all of electric vehicles 3 which have not yet been reserved for a period from the departure date and time to the return date and time, which are included in the reservation information. Note that electric vehicles 3 which cannot be dispatched due to other conditions are excluded from the reservation candidate vehicles.

Travel distance prediction unit 124 predicts a travel route based on the departure place (departure business office), the destination, and the return place (return business office), which are included in the reservation information, and predicts a travel distance based on the predicted travel route (S12). For example, while being connected to map information server 8 and inputting the departure place (departure business office), the destination, and the return place (return business office), travel distance prediction unit 124 acquires the travel route and a distance of the travel route. When a plurality of the travel routes are presented, a travel route as the highest candidate may be adopted, or a travel route having the longest travel distance may be adopted. Travel distance prediction unit 124 adds a predetermined margin to the distance of the adopted travel route, and determines a predicted travel distance.

Travel environment prediction unit 125 acquires weather forecast information of a region on the predicted travel route from weather forecast information server 7 via network 5. Travel environment prediction unit 125 acquires predicted traffic congestion information of the predicted travel route from road traffic information server 6 via network 5 (S13).

Based on the predicted travel distance, weather forecast information, and the traffic congestion information, power consumption prediction unit 126 predicts power consumption caused by use of reservation candidate vehicle by the above user (S14). Power consumption prediction unit 126 calculates basic power consumption based on, for example, the predicted travel distance and fuel efficiency (electricity efficiency) of the reservation candidate vehicle. Power consumption prediction unit 126 corrects the basic power consumption based on the travel environment information including the weather forecast information and/or the traffic congestion information.

Power consumption prediction unit 126 corrects the basic power consumption based on an air temperature included in the weather forecast information. In EVs, the electricity efficiency decreases at a low temperature. Moreover, power consumption prediction unit 126 corrects the basic power consumption based on a predicted road surface environment according to the weather forecast. The fuel efficiency (electricity efficiency) of not only EVs but also automobiles depends on the road surface environment. When the road surface is wet with rain, the fuel efficiency (electricity efficiency) decreases. Moreover, power consumption prediction unit 126 corrects the basic power consumption based on a predicted traffic congestion distance that is based on the traffic congestion information. When caught in a long traffic congestion, a number of starts and stops increases, and the power consumption increases. Further, when a travel time becomes long due to the long traffic congestion, power consumption of the in-vehicle equipment due to in-vehicle air conditioning and the like also increases.

Moreover, power consumption prediction unit 126 may acquire road information of the predicted travel route from a road information server (not shown) via network 5. Power consumption prediction unit 126 corrects the basic power consumption based on gradient information of the predicted travel route, which is included in the road information. As a number of times that such an EV climbs a steep slope increases, the electricity efficiency of the EV decreases. As described above, power consumption prediction unit 126 corrects the basic power consumption in consideration of a variety of travel environments, and can thereby improve accuracy of the predicted power consumption.

Battery information holder 131 of vehicle dispatch system 1 holds battery information of the plurality of electric vehicles 3 owned by the car rental company. The battery information includes SOHs of secondary batteries and operation history information thereof. As the operation history information, for example, there is collected and managed at least one of voltage transition (maximum, minimum, average), temperature transition (maximum, minimum, average), a charge or discharge current and C rate transition, total power consumption, total travel time, a cumulative stop time, a value and duration of a maximum output, and a number of sudden accelerations.

From battery information holder 131, degradation information calculator 127 acquires the SOHs of the secondary batteries mounted on the reservation candidate vehicles and at least a part of the operation history information thereof. Degradation information calculator 127 calculates degradation information of the secondary batteries mounted on the reservation candidate vehicles based on the SOHs and operation history information of the secondary batteries and the predicted power consumption of the reservation candidate vehicles (S15). Power limit determination unit 128 determines discharge power limits from the secondary batteries during the travel of the reservation candidate vehicles based on the degradation information calculated by degradation information calculator 127 (S16).

FIGS. 7(a) to 7(e) are diagrams for explaining the degradation information of such a secondary battery and a specific example of the discharge power limit. First, a description will be given of an example of using, as the degradation information of the secondary battery, a degradation index that is based on the SOH, operation history information, and predicted power consumption of the secondary battery, and a degradation degree that is based on the degradation degree index.

The degradation degree index of the secondary battery is calculated by, for example, following (Equation 1). Variable $i$ is a variable for specifying the reservation candidate vehicles, and the degradation degree index of the secondary battery is calculated for each of the reservation candidate vehicles.

Degradation degree index $i$ of secondary battery mounted on reservation candidate vehicle
$(i)$=SOH$(i)\times a$+(predicted basic power consumption$\times b$)+(predicted traffic congestion information$\times c$)+(battery temperature history$\times d$)+(rapid acceleration history$\times e$)  (Equation 1)

a, b, c, d, and e are coefficients for setting contribution degrees to the respective factors. The five coefficients satisfy a relationship (a+b+c+d+e=1). The contribution degrees of the respective factors are preset by a designer. Parameter range of the respective factors are set in a range of [0 to 1]. Therefore, a range of the degradation degree index also stays in the range of [0 to 1].

The SOH(i) of above (Equation 1) is calculated by following (Equation 2).

$$SOH(i) = \text{current SOH (\%) of secondary battery mounted on reservation candidate vehicle } (i)/100 \quad \text{(Equation 2)}$$

For the predicted basic power consumption of above (Equation 1), Depth Of Discharge (DOD) expected to be used in the next travel is used. For example, when the capacity of the secondary battery of the reservation candidate vehicle (i) before travel is 30 kWh, and the basic power consumption expected to be used in the next travel is 5 kWh, then the DOD is obtained as 5/30*100=17%. In this case, the predicted basic power consumption of above (Equation 1) is 0.17. Moreover, when the capacity of the secondary battery of the reservation candidate vehicle (i) before the travel is 27 kWh, and the basic power consumption expected to be used in the next travel is 12 kWh, the DOD is obtained as 12/27*100=44%. In this case, the predicted basic power consumption of above (Equation 1) is 0.44.

The predicted traffic congestion information in above (Equation 1) is calculated by a ratio of a predicted traffic congestion distance to the predicted travel distance that is based on the predicted travel route.

The battery temperature history of above (Equation 1) is determined based on an average storage temperature of the secondary battery from the time of the previous return of vehicle (i), for example, with reference to a conversion table illustrated in FIG. 7(a). For example, when the average storage temperature of the secondary battery from the time of the previous return is 25° C., the battery temperature history of above (Equation 1) is 0.3.

The rapid acceleration history of above (Equation 1) is determined based on a number of rapid accelerations per unit time, for example, with reference to a conversion table illustrated in FIG. 7(b). For example, when the number of sudden accelerations per unit time is three, the sudden acceleration history of above (Equation 1) is 0.2.

Degradation information calculator 127 converts degradation degree index i, which is calculated based on above (Equation 1) into the degradation degree, for example, with reference to a conversion table illustrated in FIG. 7(c). In the example illustrated in FIG. 7(c), the degradation degree is classified into three stages of "large", "medium", and "small".

Power limit determination unit 128 determines contents of an output limit and of the discharge power limit based on the degradation degree, for example, with reference to a conversion table illustrated in FIG. 7(d). The output limit is a limit on the power limit value calculated by battery controller 46 of battery system 40 mounted on electric vehicle 3. For example, in the example illustrated in FIG. 7(d), when the degradation degree is "large", a limit to reduce the power limit value calculated by battery controller 46 by 0.7 times is set in vehicle controller 30. When the degradation degree is "medium", a limit to reduce the power limit value calculated by battery controller 46 by 0.8 times is set in vehicle controller 30. When the degradation degree is "small", no limit to reduce the power limit value is set in vehicle controller 30.

In the example illustrated in FIG. 7(d), the discharge power limit is defined by three which are upper limit power, an acceleration limit, and a maximum speed. The upper limit power is set to a power limit value limited by the above output limit. Note that, in the example illustrated in FIG. 7(d), the upper limit power is not limited when the degradation degree is "small".

In the example illustrated in FIG. 7(d), the acceleration limit is classified into three stages of "large", "medium", and "small". When the acceleration limit is set to "large", vehicle controller 30 reduces the discharge current by inverter 35 when a change in the current flowing from the secondary battery to motor 34 exceeds a first set value. When the acceleration limit is set to "medium", vehicle controller 30 reduces the discharge current by inverter 35 when the change in the current flowing from the secondary battery to motor 34 exceeds a second set value. When the acceleration limit is set to "small", vehicle controller 30 reduces the discharge current by inverter 35 when the change in the current flowing from the secondary battery to motor 34 exceeds a third set value. At this time, a relationship of first set value<second set value<third set value is established. Note that, when the degradation degree is "small", the acceleration limit may be specified not to be provided.

Vehicle controller 30 reduces the discharge current by inverter 35 when the set maximum speed is exceeded while electric vehicle 3 is traveling. In this way, vehicle controller 30 limits the current, which flows from the secondary battery to motor 34, by three parameters of the upper limit power, the acceleration limit, and the maximum speed, and protects the secondary battery. Note that the protection of the secondary battery based on the above output limit is not essential and can be omitted. In that case, vehicle controller 30 protects the secondary battery by two parameters of the acceleration limit and the maximum speed.

As above, the description has been given of the example of using, as the degradation information of the secondary battery, the degradation index that is based on the SOH, operation history information, and predicted power consumption of the secondary battery, and the degradation degree that is based on the degradation degree index. As the simplest degradation information, a description will be given of an example of using a degradation degree derived based on only the SOH of the secondary battery.

Degradation information calculator 127 specifies the degradation degree based on the current SOH of the secondary battery, for example, with reference to a conversion table illustrated in FIG. 7(e). The example illustrated in FIG. 7(e) illustrates an example in which the lifetime of the secondary battery for in-vehicle use is set to the time when the SOH reaches 80%, Note that the use end point of the in-vehicle use is not limited to SOH=80%. Generally, the use end point is often set in a range of 60 to 80%.

According to the SOH of the secondary battery, degradation information calculator 127 may properly and selectively use a precise estimation method of estimating the degradation degree of the secondary battery by adding at least the predicted power consumption in addition to the SOH of the secondary battery and a simple estimation method of estimating the degradation degree based on only the SOH of the secondary battery.

For example, when the SOH of the secondary battery is 81%, there is a possibility that the SOH of the secondary battery may reach the use end point of the in-vehicle use during the next travel of electric vehicle 3 on which the secondary battery is mounted. When the SOH of the secondary battery is close to the use end point in this way, it is highly necessary to consider the predicted power consumption of electric vehicle 3 during the next use, electric vehicle 3 having the secondary battery mounted thereon. On the other hand, when the SOH of the secondary battery is far from the use end point, there is a less possibility that the SOH of the secondary battery may reach the use end point of the in-vehicle use during the next travel of electric vehicle 3 on which the secondary battery is mounted.

Based on the above, degradation information calculator 127 may estimate the degradation degree of the secondary battery using the above precise estimation method when the SOH of the secondary battery is less than a predetermined value (for example, 85%), and may estimate the degradation degree of the secondary battery using the above simple estimation method when the SOH is equal to or more than the predetermined value. Thus, calculation cost of processor 12 of vehicle dispatch system 1 can be reduced.

Note that the conversion tables illustrated in FIGS. 7(a) to 7(e) may be written in a source code of a program in advance, or may be registered in storage 13. Note that, since the degradation degrees illustrated in FIGS. 7(c), 7(d) and 7(e) are of intermediate information, the degradation degrees can be omitted. In that case, the degradation degree index and the SOH in FIGS. 7(c) and 7(e) will be directly linked to the output limit and the discharge power limit.

The description returns to FIG. 6. Usage fee setting unit 129 sets usage fees of the reservation candidate vehicles according to the contents of the discharge power limits of the reservation candidate vehicle (S17). Basically, the stricter the discharge power limit, the more inexpensive the usage fees are set. For example, the larger the acceleration limit of the reservation candidate vehicles, (the lower the maximum acceleration), the more inexpensive the usage fees are set. Moreover, the lower the maximum speed of the reservation candidate vehicles, the more inexpensive the usage fees are set.

Candidate list generator 1210 generates a reservation candidate list including the contents of the discharge power limits of the reservation candidate vehicles and the usage fees thereof (S18). The generated reservation candidate list is displayed on display unit 24 of user terminal device 2 (S22). When the user operates operation unit 25 of user terminal device 2 to select and confirm desired electric vehicle 3, processor 22 of user terminal device 2 accepts the information of selected electric vehicle 3. Processor 22 of user terminal device 2 transmits specific information of selected electric vehicle 3 to vehicle dispatch system 1 via network 5 (S23).

Upon acquiring the specific information of electric vehicle 3, which is transmitted from user terminal device 2, reservation information acquisition unit 122 of vehicle dispatch system 1 confirms the reservation of electric vehicle 3 selected by the user (S19). Vehicle dispatch management unit 123 updates the reservation information in reservation information holder 132 based on the confirmed reservation information.

FIG. 8 is a diagram illustrating an example of display screen 24a on which the reservation candidate list according to the first exemplary embodiment is displayed. Display screen 24a displays a list of electric vehicles 3 reservable during the period from the departure date and time input by the user to the return date and time input thereby. The acceleration limit, a speed limit, and the usage fee are displayed for each of reservable electric vehicles 3. The user selects a desired reservable vehicle from a plurality of the reservable vehicles on display screen 24a, and presses reservation key 24b. Thus, the specific information of selected electric vehicle 3 is transmitted from user terminal device 2 to vehicle dispatch system 1.

The description returns to FIG. 6. By the departure date, vehicle dispatch management unit 123 notifies electric vehicle 3, which is confirmed to be reserved, of the contents of the above discharge power limit (S110). Vehicle controller 30 of electric vehicle 3 sets the contents of the discharge power limit, which are notified from vehicle dispatch system 1. Note that, when the limit (output limit) for the power limit value from battery controller 46 is also added, vehicle controller 30 of electric vehicle 3 also sets the output limit.

By the departure date and time, an employee of the car rental company charges electric vehicle 3, which is confirmed to be reserved, to the full charge capacity. When charging the secondary battery, as a charging current rate is lower, heat is generated less, and the cycle degradation is suppressed. As mentioned above, the storage degradation depends on the SOC. The higher the SOC, the more the degradation progresses. Hence, it is preferable to store the secondary battery in a state in which the SOC is as low as possible at the time of storing the secondary battery. Based on the above, at a date and time as close as possible to the departure date and time, the employee of the car rental company charges the secondary battery, which is mounted on electric vehicle 3, from charger 4 such that the secondary battery reaches the full charge capacity. At that time, it is preferable to charge the secondary battery at a charging current rate as low as possible within a range of specifications of charger 4.

Figure 9:
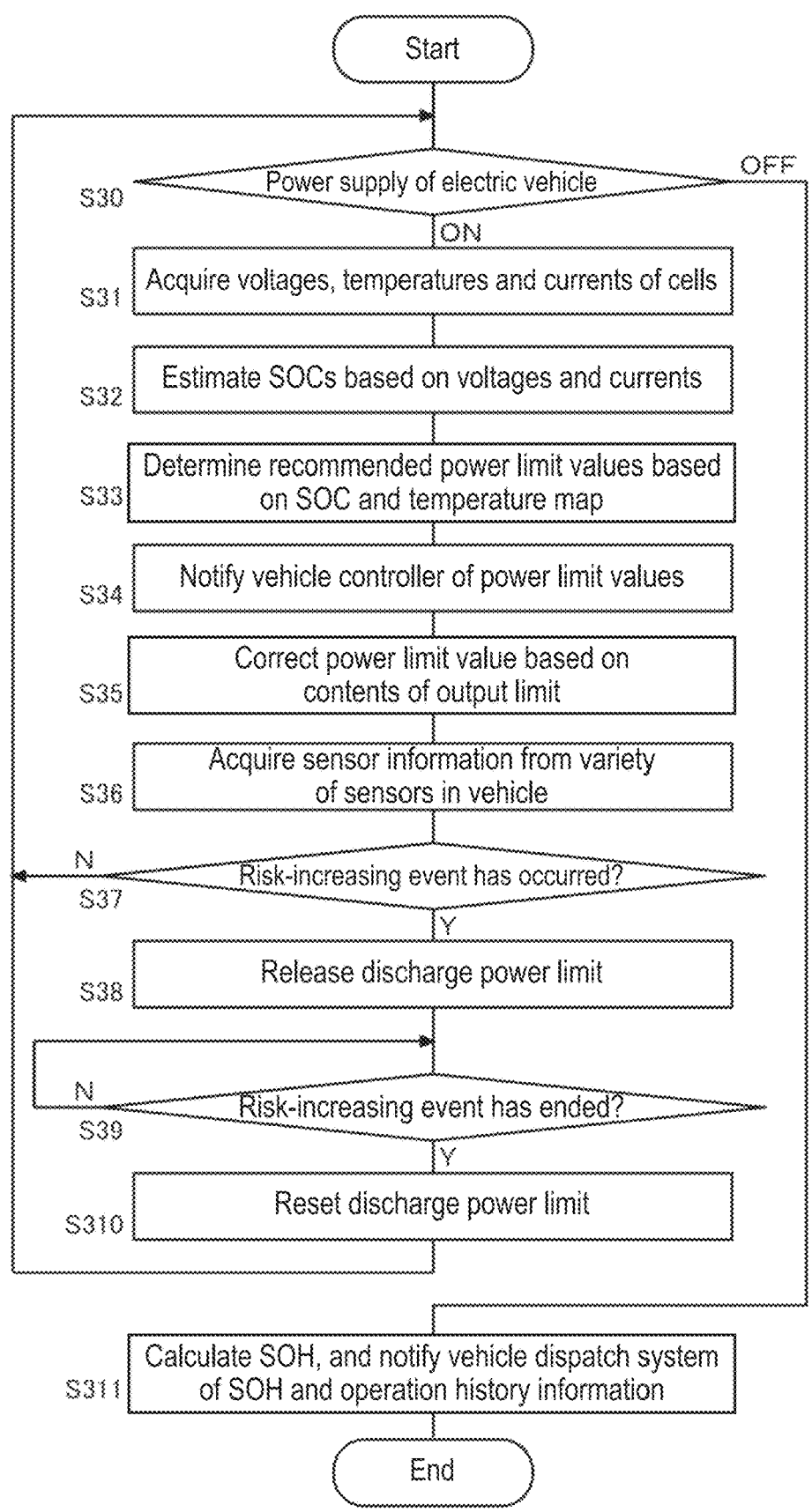
FIG. 9 is a flowchart for explaining an operation example of an electric vehicle in which the discharge power limit is set.

FIG. 9 is a flowchart for explaining an operation example of electric vehicle 3 in which the discharge power limit is set. When a power supply of electric vehicle 3 is turned on (this corresponds to turning on of an ignition in an engine vehicle) (ON in step S30), battery controller 46 acquires voltages, temperatures and currents of the plurality of cells E1 to En, which are measured by voltage measuring unit 43, temperature measuring unit 44, and current measuring unit 45 (S31). Battery controller 46 estimates the SOCs of the plurality of cells E1 to En based on the acquired voltages and currents (S32). Battery controller 46 determines recommended power limit values of the respective cells based on the estimated SOCs of the respective cells and the temperatures of the respective cells with reference to SOC and temperature map 46b (S33). Battery controller 46 selects the smallest power limit value among the determined recommended power limit values of the respective cells, and notifies vehicle controller 30 of the selected power limit value (S34).

Vehicle controller 30 corrects the power limit value, which is acquired from battery controller 46, according to the contents of the set output limit (S35). From sensor unit 37 in electric vehicle 3, vehicle controller 30 acquires the variety of sensor information for detecting the behavior of electric vehicle 3 and/or the surrounding environment of electric vehicle 3 (S36).

Vehicle controller 30 determines whether or not a risk-increasing event has occurred in electric vehicle 3 (S37). For example, when it is presumed that a driver is going to overtake, change lanes, or merge based on at least one of presence or absence of a vehicle in front and presence or absence of a vehicle on side, which are determined by image recognition processing for images taken by cameras 371, operation information from a sensor attached to a turn signal switch, and steering angle information from steering angle sensor 374, then vehicle controller 30 determines that the risk-increasing event has occurred.

Moreover, for example, also when it is presumed that an obstacle (including a person) is present around electric vehicle 3 based on at least one of the image recognition processing for the images taken by cameras 371, detection signals from sonars 372, opening information from the accelerator pedal opening sensor, opening information from the brake pedal opening sensor, and a rate of change in the discharge current from the secondary battery, then vehicle controller 30 determines that the risk-increasing event has occurred.

Upon determining that the risk-increasing event has occurred in electric vehicle 3 (Y in S37), vehicle controller 30 releases the set discharge power limit (S38). Upon determining that the risk-increasing event that has occurred in electric vehicle 3 has ended (Y in S39), vehicle controller 30 sets the discharge power limit again (S310). When vehicle controller 30 determines in step S37 that the risk-increasing event has not occurred in electric vehicle 3 (N in S37), the processing in step S38 to step S310 is skipped.

The above processing is repeatedly executed while the power supply of electric vehicle 3 is on (ON in step S30). When the power supply of electric vehicle 3 is turned off (OFF in step S30), battery controller 46 calculates the SOHs of the respective cells included in battery module 41. Via network 5, battery controller 46 notifies vehicle dispatch system 1 of the calculated SOHs and operation history information of the respective cells (S311). Battery information acquisition unit 121 of vehicle dispatch system 1 updates the battery information of electric vehicle 3 in battery information holder 131 based on the SOHs and the operation history information, which are notified from battery controller 46.

User information holder 133 can accumulate user's driving information in addition to user's registration information (name, address, gender, age, telephone number, email address, payment method, and the like). For example, user information holder 133 can accumulate the number of sudden accelerations by the user, maximum speed information, and the like. Usage fee setting unit 129 may add user's driving information when determining the usage fee of the reservation candidate vehicle. For example, usage fee setting unit 129 increases the usage fee for a user who performs driving operations which cause acceleration of the degradation of the secondary battery (the operations including sudden acceleration and the like) more frequently than a reference value, and reduces the usage fee for a user who performs the driving operations less frequently than the reference value.

As described above, according to the first exemplary embodiment, the discharge power limit of electric vehicle 3 during the next travel is adaptively changed according to the degradation state of the secondary battery mounted on electric vehicle 3. At that time, the predicted power consumption of electric vehicle 3 during the next travel can be considered based on the reservation information. Thus, the degradation of the battery during the travel of electric vehicle 3 can be finely suppressed according to a degradation state thereof, and the lifetime of the secondary battery can be extended. Moreover, the secondary battery can be prevented from reaching the use end point of the in-vehicle use while electric vehicle 3 is traveling.

Further, the above discharge power limit is temporarily released according to the vehicle behavior and surrounding environment of electric vehicle 3, whereby the driver is enabled to fully perform risk-avoiding actions in a situation where a degree of the risk is in increase, and safety is guaranteed.

Moreover, the usage fee is set according to a travel limit (acceleration limit, speed limit), whereby detailed needs of the user can be dealt with. For example, a user who wishes to rent electric vehicle 3 at a small fee selects electric vehicle 3 that is inexpensive though subjected to a strict drive limit, and can thereby meet such user's needs. Further, a user who wishes to enjoy driving selects electric vehicle 3 subjected to a loose drive limit, and can thereby meet the user's needs.

The car rental company can also expect that a mismatch between the user's needs and services provided thereby will be reduced, resulting in improvement of an operating rate of electric vehicles 3 owned thereby. Moreover, since it can be expected that a number of cases in which driving with a small burden on the secondary battery is performed will increase, a number of times that the battery is replaced can be reduced, and cost can be reduced.

Next, vehicle dispatch system 1 according to a second exemplary embodiment will be described. The first exemplary embodiment mainly assumes the case in which the destination of the user who rents and uses electric vehicle 3 is known in advance. The second exemplary embodiment mainly assumes the case in which the destination of the user who rents and uses electric vehicle 3 is not determined.

Figure 10:
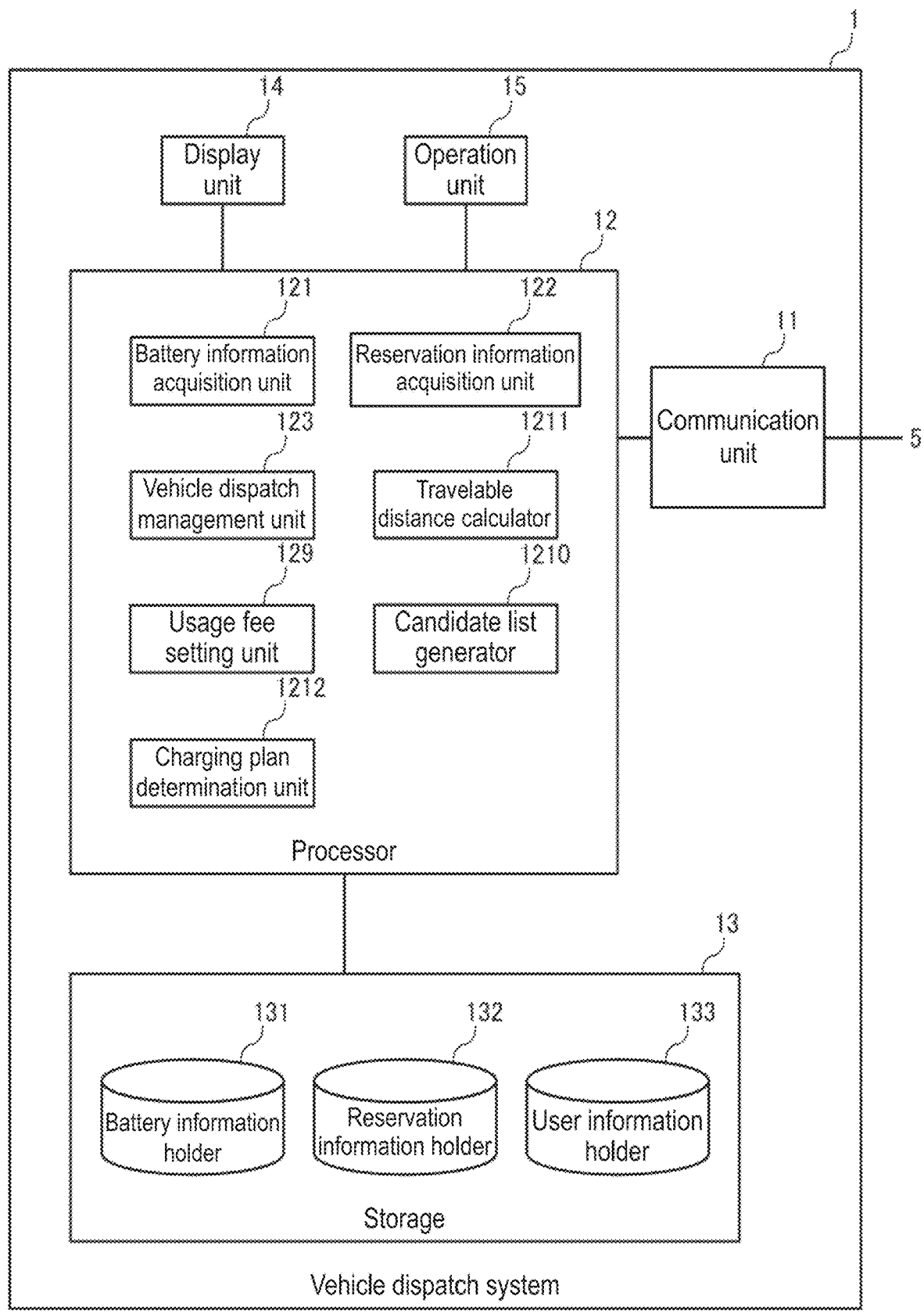
FIG. 10 is a diagram illustrating a configuration example of a vehicle dispatch system according to a second exemplary embodiment.

FIG. 10 is a diagram illustrating a configuration example of vehicle dispatch system 1 according to the second exemplary embodiment. Vehicle dispatch system 1 according to the second exemplary embodiment illustrated in FIG. 10 is different from vehicle dispatch system 1 according to the first exemplary embodiment illustrated in FIG. 2 in the contents of processor 12. In the second exemplary embodiment, processor 12 includes battery information acquisition unit 121, reservation information acquisition unit 122, vehicle dispatch management unit 123, travelable distance calculator 1211, usage fee setting unit 129, candidate list generator 1210, and charging plan determination unit 1212.

Figure 11:
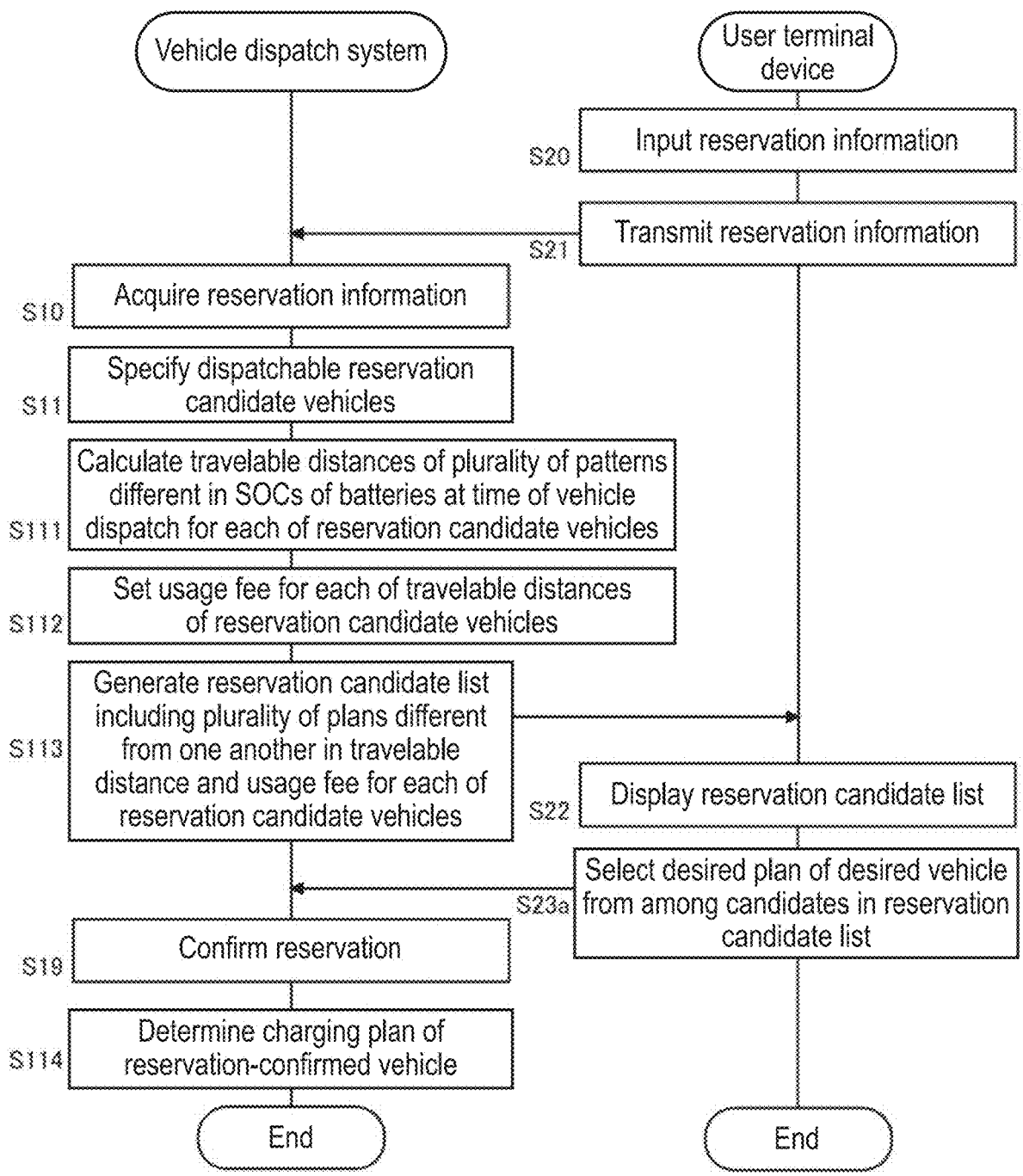
FIG. 11 is a flowchart for explaining an operation example of the vehicle dispatch system and a user terminal device according to the second exemplary embodiment.

FIG. 11 is a flowchart for explaining an operation example of vehicle dispatch system 1 and user terminal device 2 according to the second exemplary embodiment. When a user who wishes to rent electric vehicle 3 operates operation unit 25 of user terminal device 2 to input reservation information, processor 22 of user terminal device 2 accepts the input reservation information (S20). The user inputs at least information on a departure place, departure date and time, a return place, and return date and time as the reservation information. Processor 22 of user terminal device 2 transmits the input reservation information to vehicle dispatch system 1 via network 5 (S21).

Reservation information acquisition unit 122 of vehicle dispatch system 1 acquires the reservation information transmitted from user terminal device 2 (S10). Based on the acquired reservation information, vehicle dispatch management unit 123 determines reservation candidates for electric vehicle 3, which are dispatchable to the above user (hereinafter, the reservation candidates will be referred to as reservation candidate vehicles) (S11). From among the plurality of electric vehicles 3 owned by the car rental company, as the reservation candidate vehicles, vehicle dispatch management unit 123 basically selects all of electric vehicles 3 which have not yet been reserved for a period from the departure date and time to the return date and time, which are included in the reservation information. Note that electric vehicles 3 which cannot be dispatched due to other conditions are excluded from the reservation candidate vehicles.

From battery information holder 131, travelable distance calculator 1211 acquires SOCs of secondary batteries mounted on the reservation candidate vehicles. Based on the SOCs of the secondary batteries mounted on the reservation candidate vehicles, travelable distance calculator 1211 calculates travelable distances of a plurality of patterns different in the SOCs of the secondary batteries at the time of vehicle dispatch for each of the reservation candidate vehicles (S111).

The travelable distances of the plurality of patterns different in the SOCs of the secondary batteries at the time of vehicle dispatch includes a travelable distance of a pattern in which the secondary battery is not charged before vehicle dispatch. This pattern is a pattern when the SOC of the secondary battery at the time of vehicle dispatch is located at a position of SOC obtained by subtracting an amount of self-discharge from a current SOC to the departure date.

Further, the travelable distances of the plurality of patterns different in the SOCs of the secondary batteries at the time of vehicle dispatch may include a travelable distance of a pattern in which the secondary battery at the time of vehicle dispatch is in a fully charged state. Moreover, the travelable distances of the plurality of patterns different in the SOCs of the secondary batteries at the time of vehicle dispatch may include a travelable distance of a pattern in which the secondary battery at the time of vehicle dispatch is 90%. In this way, travelable distance calculator 1211 calculates the travelable distances of the plurality of patterns corresponding to the states of the SOCs of the secondary batteries at the time of vehicle dispatch.

Travelable distance calculator 1211 calculates the travelable distance based on electricity efficiency of each of the reservation candidate vehicles. Note that travelable distance calculator 1211 may correct the calculated travelable distance based on environmental conditions such as an air temperature on a day of use of the reservation candidate vehicle. In either case, the travelable distance is a guideline and is not a perfect one. Hence, when presenting the travelable distance to the user, it is preferable to present a travel distance from which a predetermined margin is already subtracted.

Usage fee setting unit 129 sets a usage fee for each of the calculated travelable distances of the reservation candidate vehicles (S112). Usage fee setting unit 219 basically sets a more inexpensive usage fee as the travelable distance is shorter.

For each of the reservation candidate vehicles, candidate list generator 1210 generates a reservation candidate list including a plurality of plans different from one another in the travelable distance and the usage fee (S113). The generated reservation candidate list is displayed on display unit 24 of user terminal device 2 (S22). When the user operates operation unit 25 of user terminal device 2 to select and confirm a desired plan of desired electric vehicle 3, processor 22 of user terminal device 2 accepts information of the selected plan. Processor 22 of user terminal device 2 transmits specific information of specifying the selected plan to vehicle dispatch system 1 via network 5 (S23*a*).

Upon acquiring the specific information of the plan, which is transmitted from user terminal device 2, reservation information acquisition unit 122 of vehicle dispatch system 1 confirms the reservation of the plan selected by the user (S19). Vehicle dispatch management unit 123 updates the reservation information in reservation information holder 132 based on the confirmed reservation information.

FIG. 12 is a diagram illustrating an example of display screen 24*c* on which the reservation candidate list according to the second exemplary embodiment is displayed. Display screen 24*c* displays a list of a plurality of reservable plans of electric vehicles 3, which are reservable during a period from departure date and time input by the user to return date and time input thereby. In the example illustrated in FIG. 12, vehicle B is of a vehicle type having a higher grade than vehicle A. Moreover, a secondary battery mounted on vehicle A is a secondary battery having a lower SOH than the secondary battery mounted on vehicle B. The user selects a desired plan from the plurality of reservable plans on display screen 24*c*, and presses reservation key 24*d*. Thus, the specific information of the selected plan is transmitted from user terminal device 2 to vehicle dispatch system 1.

The description returns to FIG. 11. According to such a specific plan of reserved specific electric vehicle 3, charging plan determination unit 1212 determines a charging plan when charging, from charger 4, the secondary battery mounted on this electric vehicle 3 (S114). The charging plan includes a charging current rate, charging start date and time, charging end date and time, and an SOC level at the end of charging. The charging current rate depends on the specifications of charger 4, but is preferably set to a value as low as possible from the viewpoint of suppressing the cycle degradation. The charging end date and time is preferably set to a date and time as close as possible to the departure date and time from the viewpoint of suppressing the storage degradation.

According to the determined charging plan, the employee of the car rental company charges the secondary battery, which is mounted on electric vehicle 3 confirmed to be reserved, to a determined SOC level from charger 4 by the departure date and time of this electric vehicle 3. Note that, when a plan not to charge the secondary battery is selected, it is not necessary to charge the secondary battery from charger 4.

As described above, according to the second exemplary embodiment, the usage fee corresponding to the travelable distance is set, whereby detailed needs of the user can be dealt with. For example, a user who wishes to travel a short distance selects an inexpensive plan with a short travelable distance, and can thereby save money. Further, a user who needs to travel a long distance selects a plan with a long travelable distance, and can thereby meet the user's needs.

The car rental company can also expect that a mismatch between the user's needs and services provided thereby will be reduced, resulting in improvement of an operating rate of electric vehicles 3 owned thereby. Further, when the plan with a short distance is selected, a number of charging and discharging times of the secondary battery can be reduced, and accordingly, the cycle degradation can be suppressed. Moreover, since the secondary battery can be on standby in with a low SOC, the storage degradation can be suppressed. Hence, a number of battery replacements can be reduced, and the cost can be reduced.

The present invention has been described above based on the exemplary embodiments. It will be understood by those skilled in the art that the exemplary embodiments are merely examples, that other exemplary modifications in which the respective constituent elements and processes of the exemplary embodiments are variously combined are possible, and that the other exemplary modifications still fall within the scope of the present invention.

In the first exemplary embodiment, the control to adaptively strengthen the output limit for suppressing the degradation according to the degradation degree is taken as a base. In this regard, control to weaken the output limit according to the degradation degree is also conceived. In this case, the travel state can be maintained without impairing drivability.

In the first and second exemplary embodiments, usage fee setting unit 129 may set the usage fee of electric vehicle 3, for which the battery needs to be replaced, to be lower than usage fees of other electric vehicles 3. A usage fee of electric vehicle 3 on which a secondary battery whose replacement data is approaching is mounted is set to be inexpensive, whereby a possibility that the SOH of the secondary battery will reach the end of use by the replacement date can be enhanced. The travelable distance of electric vehicle 3 on which such a degrading secondary battery is mounted is shortened. Hence, the user is guided such that electric vehicle 3 on which the degrading secondary battery is mounted is preferentially used, thus making it possible to efficiently operate the plurality of electric vehicles 3. Further, the user may be guided such that pieces of replacement timing of the secondary batteries of the plurality of electric vehicles 3 are distributed as much as possible.

In the first and second exemplary embodiments, the usage fee may be a real usage fee added with distribution of coupons and granting of points. In that case, the displayed usage fee may be a combination of a pre-discounted fee and an amount returned by the coupon or the points.

In the first and second exemplary embodiments, based on users' driving information accumulated in user information holder 133, usage fee setting unit 129 may distribute coupons or grant points to users who perform the driving operations, which cause the acceleration of the degradation of the secondary battery (the operations including sudden acceleration and the like), less frequently than the reference value.

In the first and second exemplary embodiments, at the time of returning electric vehicle 3, usage fee setting unit 129 may specify a number of times of the driving operations which cause the acceleration of the degradation of the secondary battery based on user's driving information during travel at this time, and may charge an additional fee to a user whose number of times of the driving operation is greater than the reference value.

In the first and second exemplary embodiments, the description is given of the example of using vehicle dispatch system 1 for the rental car service. In this regard, vehicle dispatch system 1 may be applied to a car sharing service. In particular, in the car sharing, destinations are rarely input, and accordingly, the second exemplary embodiment is a main application target. Moreover, it is also possible to apply vehicle dispatch system 1 to dispatch of taxis and product delivery services.

Note that the exemplary embodiments may be specified by the following items.

[Item 1]

Vehicle power supply system (30, 40) mounted on electric vehicle (3), including:

battery module (41) to which a plurality of cells (E1 to En) are connected; and vehicle controller (30) that switches a discharge power limit to motor (34) during travel of electric vehicle (3) according to the degradation information of battery module (41), the degradation information being calculated in advance before the travel of electric vehicle (3).

According to this, the degradation of battery module (41) during the travel of electric vehicle (3) can be finely suppressed according to the degradation information of battery module (41).

[Item 2]

Vehicle power supply system (30, 40) according to Item 1, in which vehicle controller (30) switches a limit of a maximum acceleration and/or maximum speed of electric vehicle (3) as the switching of the discharge power limit.

According to this, the degradation of battery module (41) during the travel of electric vehicle (3) can be finely suppressed by switching such a travel limit.

[Item 3]

Vehicle power supply system (30, 40) according to Item 1 or 2, further including:

voltage measuring unit (43) that measures respective voltages of the plurality of cells (E1 to En);

current measuring unit (45) that measures currents flowing through the plurality of cells (E1 to En);

temperature measuring unit (44) that measures temperatures of plurality of cells (E1 to En); and battery controller (46) that determines a power limit value that defines upper limits of a current and power recommended for suppressing cell degradation based on the voltages respective cells (E1 to En), the voltages being measured by voltage measuring unit (43), the currents measured by current measuring unit (45), and the temperatures measured by temperature measuring unit (44), and notifies vehicle controller (30) of the determined power limit value, in which, according to the degradation information of battery module (41), the degradation information being calculated in advance, vehicle controller (30) corrects the power limit value notified from battery controller (46).

According to this, the degradation of battery module (41) during the travel of electric vehicle (3) can be finely suppressed by correcting the power limit value.

[Item 4]

Vehicle power supply system (30, 40) according to any one of Items 1 to 3, in which, upon estimating a behavior of electric vehicle (3) and/or a surrounding environment of electric vehicle (3) based on information acquired from sensor (37) installed in electric vehicle (3), and determining that a risk-increasing event has occurred, vehicle controller (30) releases the discharge power limit.

According to this, safety can be guaranteed.

[Item 5]

Vehicle dispatch system (1) communicable with a plurality of electric vehicles (3), including:

battery information acquisition unit (121) that acquires, from the plurality of electric vehicles (3), battery information including information indicating states of secondary batteries (41) mounted on electric vehicles (3);

battery information holder (131) that holds the acquired battery information of the plurality of electric vehicles (3);

reservation information acquisition unit (122) that acquires reservation information via network (5) from terminal device (2) operated by a user who wishes to use each of electric vehicles (3);

vehicle dispatch management unit (123) that, based on the reservation information, determines reservation candidates for electric vehicles (3) dispatchable to the user;

degradation information calculator (127) that calculates degradation information of each secondary battery (41) mounted on each electric vehicle (3) as the reservation candidate based on the battery information of each secondary battery (41); and power limit determination unit (128) that, based on the degradation information of each secondary battery (41), determines a discharge power limit from each secondary battery (41) during travel for each of electric vehicles (3) as the reservation candidates.

According to this, vehicle dispatch system (1) capable of suppressing the degradation of secondary battery (41) mounted on electric vehicle (3) during the travel can be constructed.

[Item 6]

Vehicle dispatch system (1) according to Item 5, in which, after an end of use of each of electric vehicles (3), battery information acquisition unit (121) acquires, from electric vehicle (3), a State of Health (SOH) and operation history information of secondary battery (41) mounted on electric vehicle (3), and updates battery information of electric vehicle (3) in battery information holder (131).

According to this, the state of secondary battery (41) mounted on each electric vehicle (3) can be accurately grasped.

[Item 7]

Vehicle dispatch system (1) according to Item 6, in which, based on at least the SOH and operation history information of each secondary battery (41) mounted on each electric vehicle (3) as the reservation candidate, degradation information calculator (127) calculates the degradation information of each secondary battery (41).

According to this, degradation information considering the operation history information can be calculated.

[Item 8]

Vehicle dispatch system (1) according to Item 5, further including power consumption prediction unit (126) that, based on a predicted travel distance of a predicted travel route that is based on destination information included in the reservation information, predicts power consumption of secondary battery (41) mounted on electric vehicle (3), the power consumption being caused by use of electric vehicle (3) by a user who has reserved electric vehicle (3), in which, based on at least an SOH of each secondary battery (41) and the predicted power consumption caused by use of each electric vehicle (3), degradation information calculator (127) calculates the degradation information of each secondary battery (41) mounted on each electric vehicle (3) as the reservation candidate.

According to this, degradation information considering the predicted power consumption during the next travel of electric vehicle (3) can be calculated.

[Item 9]

Vehicle dispatch system (1) according to Item 8, further including travel environment prediction unit (125) that predicts a travel environment including weather forecast information during use of electric vehicle (3) and/or traffic congestion information of the predicted travel route, in which, based on the predicted travel distance and the travel environment, power consumption prediction unit (126) predicts power consumption of secondary battery (41) mounted on electric vehicle (3), the power consumption being caused by use of electric vehicle (3).

According to this, the power consumption considering the travel environment can be predicted.

[Item 10]

Vehicle dispatch system (1) according to any one of Items 5 to 9, further including:

usage fee setting unit (129) that sets a usage fee of each electric vehicle (3) as the reservation candidate according to the determined discharge power limit of each electric vehicle (3); and candidate list generator (1210) that generates a reservation candidate list including contents of the discharge power limit of each electric vehicle (3) as the reservation candidate and the set usage fee of each electric vehicle (3).

According to this, a usage fee corresponding to the discharge power limit can be presented to the user.

[Item 11]

Vehicle dispatch system (1) according to Item 10, in which the discharge power limit includes a limit on a maximum acceleration and/or maximum speed of electric vehicle (3), and usage fee setting unit (129) sets a more inexpensive usage fee as the maximum acceleration and/or maximum speed of electric vehicle (3) is set lower.

According to this, fee setting that meets a variety of needs of the user can be achieved.

[Item 12]

Vehicle dispatch system (1) communicable with a plurality of electric vehicles (3), including:

battery information acquisition unit (121) that acquires, from the plurality of electric vehicles (3), battery information including information indicating states of secondary batteries (41) mounted on electric vehicles (3);

battery information holder (131) that holds the acquired battery information of the plurality of electric vehicles (3);

reservation information acquisition unit (122) that acquires reservation information via network (5) from terminal device (2) operated by a user who wishes to use each of electric vehicles (3);

vehicle dispatch management unit (123) that, based on the reservation information, determines reservation candidates for electric vehicles (3) dispatchable to the user;

travelable distance calculator (1211) that, based on an SOC of secondary battery (41) mounted on each of electric vehicles (3) as the reservation candidates, calculates travelable distances of a plurality of patterns different in the SOCs of secondary batteries (41) at a time of vehicle dispatch for each of electric vehicles (3) as the reservation candidates;

usage fee setting unit (129) that sets a usage fee of each of electric vehicles (3) as the reservation candidates for each of the calculated travelable distances; and candidate list generator (1210) that, for each of electric vehicles (3) as the reservation candidates, generates a reservation candidate list including a plurality of plans different from one another in the travelable distance and the usage fee.

According to this, a plurality of usage fee plans corresponding to the travelable distance can be presented to the user.

[Item 13]

Vehicle dispatch system (1) according to Item 12, in which usage fee setting unit (129) sets a more inexpensive usage fee as the travelable distance is shorter.

According to this, fee setting that meets a variety of needs of the user can be achieved.

[Item 14]

Vehicle dispatch system (1) according to Item 12 or 13, further including charging plan determination unit (1212) that, according to a specific plan of specific electric vehicle (3) confirmed to be reserved, determines a charging plan when charging secondary battery (41) mounted on electric vehicle (3) from a charger.

According to this, charging in which degradation is suppressed is made possible, and the degradation of secondary battery (41) can be suppressed.

[Item 15]

Vehicle dispatch system (1) according to any one of Items 12 to 14, in which usage fee setting unit (129) sets a usage fee of electric vehicle (3) for which the battery needs to be replaced to be lower than usage fees of other electric vehicles (3).

According to this, the user can be guided to use electric vehicle (3) for which the battery needs to be replaced.

REFERENCE MARKS IN THE DRAWINGS

1: vehicle dispatch system
2: user terminal device
3: electric vehicle
3a: electric vehicle A
3b: electric vehicle B
3c: electric vehicle C
4: charger
5: network
6: road traffic information server
7: weather forecast information server
8: map information server
9: commercial power system
11: communication unit
12: processor
121: battery information acquisition unit
122: reservation information acquisition unit
123: vehicle dispatch management unit
124: travel distance prediction unit
125: travel environment prediction unit
126: power consumption prediction unit
127: degradation information calculator
128: power limit determination unit
129: usage fee setting unit
1210: candidate list generator
1211: travelable distance calculator
1212: charging plan determination unit
13: storage
131: battery information holder
132: reservation information holder
133: user information holder
14: display unit
15: operation unit
21: communication unit
21a: antenna
22: processor
23: storage
24: display unit
25: operation unit
30: vehicle controller
31f: front wheel
31r: rear wheel
32f: front wheel axle
32r: rear wheel axle
33: transmission
34: motor
35: inverter
36: wireless communication unit
36a: antenna
37: sensor unit
371: camera
372: sonar
373: vehicle speed sensor
374: steering angle sensor
38: charging cable
40: battery system
41: battery module
42: management unit
43: voltage measuring unit
44: temperature measuring unit
45: current measuring unit
46: battery controller
46a: SOC-OCV map
46b: SOC and temperature map
E1,E2,En: cell
Rs: shunt resistor
T1: first temperature sensor
T2: second temperature sensor
RY1: first relay
RY2: second relay

The invention claimed is:

1. A vehicle power supply system mounted on an electric vehicle, the vehicle power supply system comprising:
a battery module to which a plurality of cells are connected; and
a vehicle controller that switches a discharge power limits to a motor during travel of the electric vehicle according to degradation information of the battery module, the degradation information being calculated in advance before the travel of the electric vehicle.

2. The vehicle power supply system according to claim 1, wherein the vehicle controller switches a limit of a maximum acceleration and/or maximum speed of the electric vehicle as the switching of the discharge power limits.

3. The vehicle power supply system according to claim 1, further comprising:
a voltage measuring unit that measures voltages of the plurality of cells;
a current measuring unit that measures current flowing through the plurality of cells;
a temperature measuring unit that measures temperatures of the plurality of cells; and
a battery controller that determines a power limit value that defines upper limits of a current and power recommended for suppressing cell degradation based on the voltages measured by the voltage measuring unit, the current measured by the current measuring unit, and the temperatures measured by the temperature measuring unit, and notifies the vehicle controller of the power limit value,
wherein, according to the degradation information of the battery module, the vehicle controller corrects the power limit value notified from the battery controller.

4. The vehicle power supply system according to claim 1, wherein, upon estimating a behavior of the electric vehicle and/or a surrounding environment of the electric vehicle based on information acquired from a sensor installed in the electric vehicle, and determining that a risk-increasing event has occurred, the vehicle controller releases the discharge power limit.

5. A vehicle dispatch system configured to communicate with a plurality of electric vehicles, vehicle dispatch system comprising:
a battery information acquisition unit that acquires, from the plurality of electric vehicles, battery information items each including information indicating a state of a secondary battery mounted on a respective one of the plurality of electric vehicles;
a battery information holder that holds the battery information items acquired;
a reservation information acquisition unit that acquires reservation information via a network from a terminal device operated by a user who wishes to use each of the plurality of electric vehicles;
a vehicle dispatch management unit that, based on the reservation information, determines one or more reservation candidates for one or more electric vehicles dispatchable to the user among the plurality of electric vehicles;

a degradation information calculator that calculates degradation information of a secondary battery mounted on each of electric vehicles as the one or more reservation candidates based on a battery information item of the secondary battery; and a power limit determination unit that determines, based on the degradation information of the secondary battery, a discharge power limit from the secondary battery during travel for the each of the electric vehicles as the one or more reservation candidates.

6. The vehicle dispatch system according to claim 5, wherein, after an end of use of each of the electric vehicles, the battery information acquisition unit acquires, from the each of electric vehicles, a State OF Health and operation history information of the secondary battery mounted on the each of electric vehicles, and updates the battery information item of the each of electric vehicles in the battery information holder.

7. The vehicle dispatch system according to claim 6, wherein, based on at least the State OF Health and operation history information of secondary battery mounted on the each of electric vehicles as the one or more reservation candidates, the degradation information calculator calculates the degradation information of the secondary battery.

8. The vehicle dispatch system according to claim 5, further comprising a power consumption prediction unit that, based on a predicted travel distance of a predicted travel route that is based on destination information included in the reservation information, predicts power consumption of the secondary battery mounted on the each of electric vehicles, the power consumption being caused by use of the electric vehicle by a user who has reserved the each of electric vehicles, wherein, based on at least an State OF Health of the secondary battery and the predicted power consumption caused by use of the each of electric vehicles, the degradation information calculator calculates the degradation information of the secondary battery mounted on the each of electric vehicles as the one or more reservation candidates.

9. The vehicle dispatch system according to claim 8, further comprising a travel environment prediction unit that predicts a travel environment including weather forecast information during use of the each of electric vehicles and/or traffic congestion information of the predicted travel route, wherein, based on the predicted travel distance and the travel environment, the power consumption prediction unit predicts power consumption of the secondary battery mounted on the each of electric vehicles, the power consumption being caused by use of the each of electric vehicles.

10. The vehicle dispatch system according to claim 5, further comprising:

a usage fee setting unit that sets a usage fee of the each of electric vehicles as the one or more reservation candidate according to the discharge power limit determined of the each of electric vehicles; and a candidate list generator that generates a reservation candidate list including contents of the discharge power limit of the each of electric vehicles as the one or more reservation candidates and the set usage fee of the each of electric vehicles.

11. The vehicle dispatch system according to claim 10, wherein the discharge power limit includes a limit on a maximum acceleration and/or maximum speed of the each of electric vehicles, and the usage fee setting unit sets a more inexpensive usage fee as the maximum acceleration and/or maximum speed of the each of electric vehicles is set lower.

12. A vehicle dispatch system configured to communicate with a plurality of electric vehicles, comprising:

a battery information acquisition unit that acquires, from the plurality of electric vehicles, battery information items each including information indicating a state of a secondary battery mounted on a respective one of the plurality of electric vehicles;

a battery information holder that holds the battery information items acquired;

a reservation information acquisition unit that acquires reservation information via a network from a terminal device operated by a user who wishes to use each of the plurality of electric vehicles;

a vehicle dispatch management unit that, based on the reservation information, determines one or more reservation candidates for one or more electric vehicles dispatchable to the user among the plurality of electric vehicles;

a travelable distance calculator that, based on a State Of Charge of the secondary battery mounted on each of the electric vehicles as the one or more reservation candidates, calculates travelable distances of a plurality of patterns different in State Of Charges of the secondary batteries at a time of vehicle dispatch for each of the electric vehicles as the one or more reservation candidates;

a usage fee setting unit that sets a usage fee of each of the electric vehicles as the one or more reservation candidates for each of the calculated travelable distances; and a candidate list generator that, for each of the electric vehicles as the one or more reservation candidates, generates a reservation candidate list including a plurality of plans different from one another in the travelable distance and the usage fee.

13. The vehicle dispatch system according to claim 12, wherein the usage fee setting unit sets a more inexpensive usage fee as the travelable distance is shorter.

14. The vehicle dispatch system according to claim 12, further comprising a charging plan determination unit that, according to a specific plan of a specific electric vehicle confirmed to be reserved among the plurality of electric vehicles, determines a charging plan when charging a secondary battery mounted on the electric vehicle from a charger.

15. The vehicle dispatch system according to claim 12, wherein the usage fee setting unit sets a usage fee of an electric vehicle for which the battery needs to be replaced to be lower than usage fees of other electric vehicles.

* * * * *